US012188367B2

(12) United States Patent
Runkel et al.

(10) Patent No.: US 12,188,367 B2
(45) Date of Patent: Jan. 7, 2025

(54) HANDLING SYSTEM FOR TURBINE SHROUD

(71) Applicant: GE Infrastructure Technology LLC, Greenville, SC (US)

(72) Inventors: Christopher David Runkel, Greer, SC (US); István Bacsa, Bujak (HU)

(73) Assignee: GE Infrastructure Technology LLC, Greenville, SC (US)

( * ) Notice: Subject to any disclaimer, the term of this patent is extended or adjusted under 35 U.S.C. 154(b) by 96 days.

(21) Appl. No.: 18/045,620

(22) Filed: Oct. 11, 2022

(65) Prior Publication Data

US 2024/0117758 A1 Apr. 11, 2024

(51) Int. Cl.
*F01D 25/28* (2006.01)
*B66C 1/66* (2006.01)

(52) U.S. Cl.
CPC .............. *F01D 25/285* (2013.01); *B66C 1/66* (2013.01); *F05D 2230/60* (2013.01)

(58) Field of Classification Search
CPC ...... F01D 25/285; B66C 1/66; F05D 2230/60
See application file for complete search history.

(56) References Cited

U.S. PATENT DOCUMENTS

| | | | | |
|---|---|---|---|---|
| 4,475,291 | A | 10/1984 | Aymen | |
| 9,816,398 | B2 | 11/2017 | Sajdak et al. | |
| 2012/0145976 | A1 * | 6/2012 | Hynous | B66F 3/08 254/98 |
| 2012/0204398 | A1 * | 8/2012 | Herbold | F01D 25/285 81/53.2 |
| 2015/0260043 | A1 * | 9/2015 | Holmes | B25B 5/108 29/244 |
| 2016/0097282 | A1 * | 4/2016 | Clark | F01D 5/12 409/178 |
| 2016/0160689 | A1 | 6/2016 | Sajdak et al. | |
| 2018/0100396 | A1 * | 4/2018 | Lipkin | B23P 6/002 |

FOREIGN PATENT DOCUMENTS

| | | | |
|---|---|---|---|
| KR | 200332133 | Y1 | 11/2003 |
| KR | 101044848 | B1 | 6/2011 |
| KR | 101828182 | B1 | 2/2018 |

OTHER PUBLICATIONS

International Search Report in PCT/US2023/076114, mailed Feb. 6, 2024, 3 pages.
International Preliminary Report on Pantentability PCT/US2023/076114, mailed Oct. 4, 2024, 5 pages.

* cited by examiner

*Primary Examiner* — Stephen A Vu
(74) *Attorney, Agent, or Firm* — James Pemrick; Charlotte Wilson; Hoffman Warnick LLC

(57) ABSTRACT

A handling system includes an elongated member including a first end and a second end, and a first bend therein. The elongated member is positioned in a slot of the turbine shroud. A base retention member extends from the first end of the elongated member to engage and retain a first end portion of the turbine shroud on the elongated member, and a sliding retainer is configured to slidingly receive the elongated member. The sliding retainer is shaped and sized to slidingly engage in the slot and selectively retain a second end portion of the turbine shroud in a handling position on the elongated member. A lock is coupled to the sliding retainer and selectively movable between a locked position in which the lock retains the sliding retainer in the handling position and an unlocked position in which the sliding retainer slides freely on the elongated member.

21 Claims, 16 Drawing Sheets

HANDLING SYSTEM FOR TURBINE SHROUD

TECHNICAL FIELD

The disclosure relates generally to handling systems and, more particularly, to a handling system for a turbine shroud.

BACKGROUND

Industrial components such as turbine shrouds can be very heavy. In addition, many industrial components have physical structure that makes them hard to safely handle and move. For example, FIG. 1 shows a perspective view of an illustrative turbine shroud 118 that includes a body 119 having a female opening 127 in the form of a curved slot 128 therein. Body 119 of turbine shroud 118 is also curved along its length, and thus is challenging to securely handle. Each turbine shroud 118 is part of a set of turbine shrouds for a particular stage of a turbine amongst a plurality of stages. Curved slot 128 is used to mount turbine shroud 118 along with a set of identical turbine shrouds on an inner circumference of a casing of a turbine to form a turbine shroud stage. Turbine shrouds 118 for a given stage have different circumferential, axial, and radial sizes compared to those for another stage. Thus, many different varieties of turbine shrouds 118 must be handled for a given turbine, and even larger variety of turbine shrouds must be handled for a fleet of different sized turbines.

During manufacture or during assembly in the field, turbine shrouds 118 must be lifted and moved so they can be packaged for transportation purposes or installed in a turbine. In some cases, access to the turbine shroud is limited, e.g., when it is closely positioned to sides of a holding pocket in a transportation container. Typically, the lifting is performed using some sort of handling system to connect to tip shroud 118, and some sort of lifting equipment such as a crane, forklift, or robotic arm, to lift the shroud using the handling system. FIG. 2 shows a perspective view of a conventional handling system 130 used for turbine shroud 118 (FIG. 1). Handling system 130 and similar systems use rudimentary structures to grasp turbine shroud 118. For example, handling system 130 includes a pair of opposing arms 132, 134 that are spatially adjustable using a linear actuator 136, such as a hand-operated worm gear, to selectively grasp turbine shroud 118 (FIG. 1). Handling system 130 is dependent on sufficient force to be applied by linear actuator 136. Further, while the simple design of handling system 130 allows it to handle practically any turbine shroud 118 despite the shrouds size or shape, it is not ideal for any of them. Thus, handling system 130 may complicate handling processes by requiring a number of grasping, moving, releasing, and re-grasping steps. For example, the conventional handling system 130 requires tip shroud 118 to be grasped, moved, released, and re-grasped three times to install it in a turbine.

BRIEF DESCRIPTION

All aspects, examples and features mentioned below can be combined in any technically possible way.

An aspect of the disclosure provides a handling system for a turbine shroud having a slot therein, the handling system comprising: an elongated member including a first end and a second end, the elongated member including a first bend therein, the elongated member configured to be positioned in the slot of the turbine shroud; a base retention member extending from the first end of the elongated member to engage and retain a first end portion of the turbine shroud on the elongated member; a sliding retainer including a body having an opening configured to slidingly receive the elongated member, the body of the sliding retainer configured to slidingly engage in the slot and selectively retain a second end portion of the turbine shroud in a handling position on the elongated member; and a lock coupled to the sliding retainer and selectively movable between a locked position in which the lock retains the sliding retainer in the handling position and an unlocked position in which the sliding retainer slides freely on the elongated member.

Another aspect of the disclosure includes any of the preceding aspects, and the lock includes a pin selectively movable between the locked position in which the pin extends through a first opening in the elongated member and retains the sliding retainer in the handling position, and the unlocked position in which the pin is retracted from the first opening in the elongated member and allows the sliding retainer to slide freely on the elongated member.

Another aspect of the disclosure includes any of the preceding aspects, and, in the unlocked position, the pin is positioned in a second opening in the elongated member spaced from the first opening.

Another aspect of the disclosure includes any of the preceding aspects, and the pin includes a spring-loaded pin coupled to the sliding retainer.

Another aspect of the disclosure includes any of the preceding aspects, and the first bend in the elongated member is configured to engage an inner surface of the slot and position the base retention member to engage and retain the first end portion of the turbine shroud on the elongated member.

Another aspect of the disclosure includes any of the preceding aspects, and wherein the sliding retainer includes a first end, a second end, a first side and a second side, and wherein the first side of the sliding retainer extends farther from the first end of the sliding retainer than the second side of the sliding retainer, and wherein the first side of the sliding retainer engages a same inner surface of the slot of the turbine shroud as the first bend of the elongated member.

Another aspect of the disclosure includes any of the preceding aspects, and the second side of the sliding retainer includes a ramped surface extending at less than 90° from the elongated member.

Another aspect of the disclosure includes any of the preceding aspects, and the body of the sliding retainer has a first portion having a shape and size configured to slidingly engage in the slot, and a second portion larger than the first portion and configured to abut the second end portion of the turbine shroud to selectively retain the second end portion of the turbine shroud in the handling position on the elongated member.

Another aspect of the disclosure includes any of the preceding aspects, and further comprising a spacing member coupled to the elongated member adjacent the base retention member.

Another aspect of the disclosure includes any of the preceding aspects, and further comprising a handle coupled to the second end of the elongated member.

Another aspect of the disclosure includes any of the preceding aspects, and the base retention member extending from the first end of the elongated member includes a second bend in the elongated member.

Another aspect of the disclosure includes any of the preceding aspects, and the elongated member includes a plurality of elongated members, each elongated member having a different length and a different angle in a respective first bend compared to others of the plurality of elongated members to accommodate a selected turbine shroud of a plurality of different turbine shrouds, and wherein the sliding retainer includes a plurality of sliding retainers, each sliding retainer having at least one of a different shape and a different size compared to the others of the plurality of sliding retainers to accommodate the slot of the turbine shroud of a selected turbine shroud of the plurality of different turbine shrouds.

Another aspect of the disclosure includes any of the preceding aspects, and the slot is a curved slot.

Another aspect of the disclosure includes a handling system for a first set of turbine shrouds having a first dimension and at least one second set of turbine shrouds having a second, different dimension than the first set, the turbine shrouds of both sets having a curved slot therein, the handling system comprising for each of the first set and the second set: an elongated member including a first end and a second end, the elongated member including a first bend therein, the elongated member and the first bend configured to be positioned in the curved slot of the turbine shroud of a respective set; a base retention member extending from the first end of the elongated member to engage and retain a first end portion of the turbine shroud of the respective set on the elongated member; a sliding retainer including a body having an opening configured to slidingly receive the elongated member for the turbine shroud of the respective set, the body of the sliding retainer configured to slidingly engage in the curved slot of the turbine shroud of the respective set and selectively retain a second end portion of the turbine shroud of the respective set in a handling position on the elongated member; and a lock coupled to the sliding retainer and selectively movable between a locked position in which the lock retains the sliding retainer in the handling position and an unlocked position in which the sliding retainer slides freely on the elongated member.

Another aspect of the disclosure includes any of the preceding aspects, and the lock includes a pin selectively movable between the locked position in which the pin extends through a first opening in the elongated member and retains the sliding retainer in the handling position, and the unlocked position in which the pin is retracted from the first opening in the elongated member and allows the sliding retainer to slide freely on the elongated member.

Another aspect of the disclosure includes any of the preceding aspects, and, in the unlocked position, the pin is positioned in a second opening in the elongated member spaced from the first opening.

Another aspect of the disclosure includes any of the preceding aspects, and the pin includes a spring-loaded pin coupled to the sliding retainer.

Another aspect of the disclosure includes any of the preceding aspects, and the first bend in the elongated member is configured to engage an inner surface of the curved slot of the turbine shroud of the respective set and position the base retention member to engage and retain the first end portion of the turbine shroud of the respective set on the elongated member.

Another aspect of the disclosure includes any of the preceding aspects, and wherein the sliding retainer includes a first end, a second end, a first side and a second side, and wherein the first side of the sliding retainer extends farther from the first end of the sliding retainer than the second side of the sliding retainer, and wherein the first side of the sliding retainer engages a same inner surface of the curved slot of the turbine shroud as the first bend of the elongated member.

Another aspect of the disclosure includes any of the preceding aspects, and the body of the sliding retainer has a first portion having a shape and size configured to slidingly engage in the curved slot of the turbine shroud of the turbine shroud of the respective set, and a second portion larger than the first portion and configured to abut the second end portion of the turbine shroud of the respective set to selectively retain the second end portion of the turbine shroud of the turbine shroud of the respective set in the handling position on the elongated member.

Another aspect of the disclosure includes a method of grasping a turbine shroud having a curved slot therein, the method comprising: positioning an elongated member in the curved slot of the turbine shroud, the elongated member including a first end, a second end, a first bend between the first end and the second end and a base retention member extending from the first end and engaging and retaining a first end portion of the turbine shroud on the elongated member; sliding a sliding retainer along the elongated member and into the curved slot at a second end portion of the turbine shroud to a handling position on the elongated member, the sliding retainer configured to abut the second end portion of the turbine shroud in the handling position; and locking the sliding retainer in a locked position in which the sliding retainer is fixed relative to the elongated member in the handling position and the sliding retainer grasps and retains the turbine shroud on the elongated member.

Two or more aspects described in this disclosure, including those described in this summary section, may be combined to form implementations not specifically described herein.

The details of one or more implementations are set forth in the accompanying drawings and the description below. Other features, objects and advantages will be apparent from the description and drawings, and from the claims.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

Figure 1:
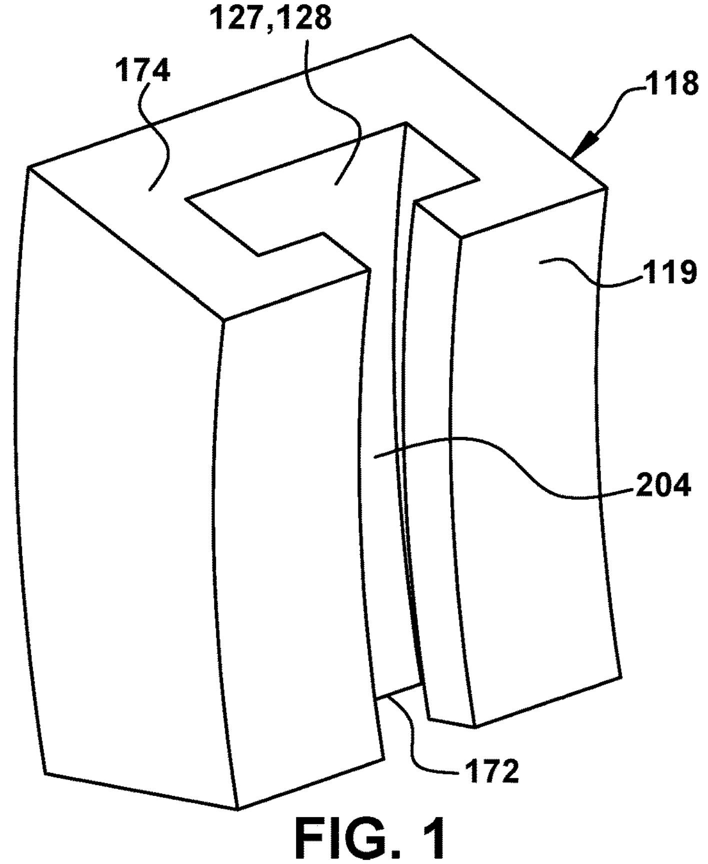
FIG. 1 (Prior Art)
FIG. 1 shows a perspective view of a turbine shroud, according to the prior art.
Figure 2:
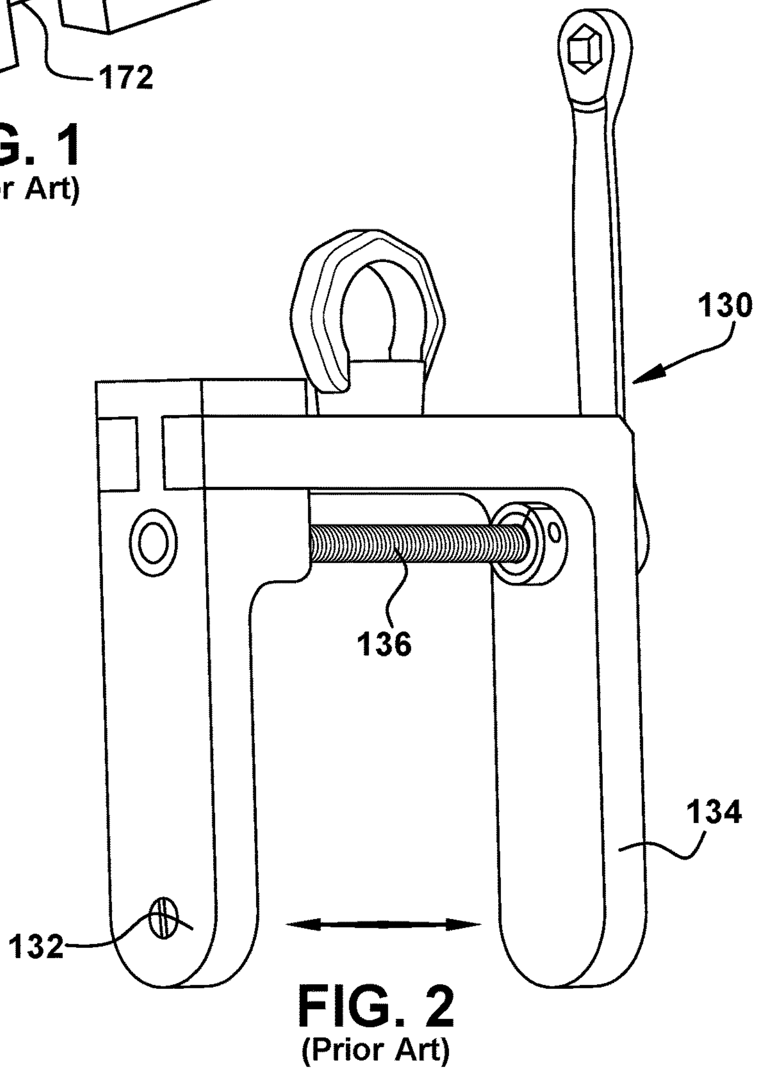
FIG. 2 (Prior Art)
FIG. 2 shows a perspective view of a handling system, according to the prior art.

It is noted that the drawings of the disclosure are not necessarily to scale. The drawings are intended to depict only typical aspects of the disclosure and therefore should not be considered as limiting the scope of the disclosure. In the drawings, like numbering represents like elements between the drawings.

DETAILED DESCRIPTION

As an initial matter, in order to clearly describe the current disclosure, it will become necessary to select certain terminology when referring to and describing relevant machine components within the illustrative application of a turbomachine. When doing this, if possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. It is often required to describe parts that are at different radial positions with regard to a center axis. The term "axial" refers to movement or position parallel to an axis, e.g., an axis of a turbomachine. The term "radial" refers to movement or position perpendicular to an axis, e.g., an axis of a turbomachine. In cases such as this, if a first component resides closer to the axis than a second component, it will be stated herein that the first component is "radially inward" or "inboard" of the second component. If, on the other hand, the first component resides further from the axis than the second component, it may be stated herein that the first component is "radially outward" or "outboard" of the second component. Finally, the term "circumferential" refers to movement or position around an axis, e.g., a circumferential interior surface of a casing extending about an axis of a turbomachine. As indicated above, it will be appreciated that such terms may be applied in relation to the axis of the turbomachine.

In addition, several descriptive terms may be used regularly herein, as described below. The terms "first," "second," and "third," may be used interchangeably to distinguish one component from another and are not intended to signify location or importance of the individual components.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described feature or element may or may be present and that the description includes instances where the feature is present and instances where it is not present.

Where an element or layer is referred to as being "on," "engaged to," "disengaged from," "connected to" or "coupled to" or "mounted to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, no intervening elements or layers are present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items. The verb forms of "couple" and "mount" may be used interchangeably herein.

As indicated above, the disclosure provides a handling system for a turbine shroud having a slot therein, the slot can be curved. The handling system may include an elongated member including a first end and a second end, and a first bend therein. The elongated member is configured to be positioned in the slot of the turbine shroud. A base retention member extends from the first end of the elongated member to engage and retain a first end portion of the turbine shroud on the elongated member, and a sliding retainer is configured to slidingly receive the elongated member. The sliding retainer has a shape and size configured to slidingly engage in the slot and selectively retain a second end portion of the turbine shroud in a handling position on the elongated member. A lock is coupled to the sliding retainer and selectively movable between a locked position in which the lock retains the sliding retainer in the handling position and an unlocked position in which the sliding retainer slides freely on the elongated member. The handling system is customizable for any variety of different sized turbine shrouds, and addresses handling requirements in both the factory and the field. The system can be attached ergonomically and safely despite limited access to the turbine shroud caused by, for example, tight-fitting transportation containers. The system also reduces cycle time in the field by allowing turbine shrouds to be installed in the factory, thus reducing field handling and potential damage to capital parts.

Figure 3:
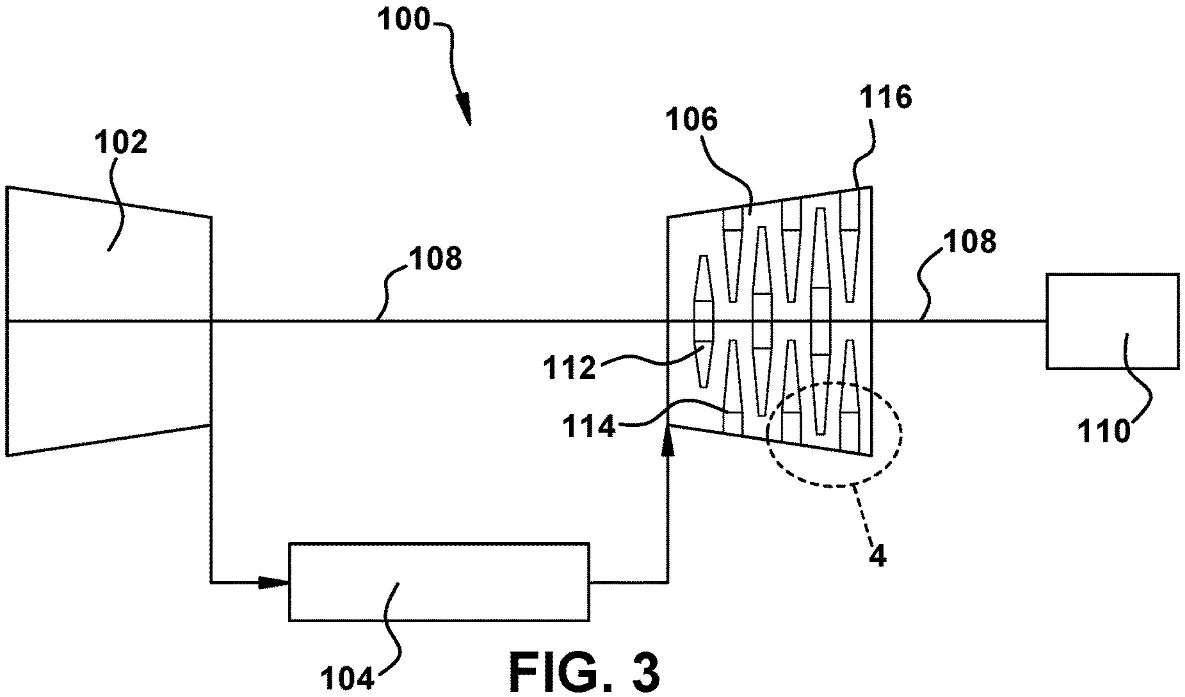
FIG. 3 shows a schematic depiction of a turbine system.

Turning to FIG. 3, a schematic depiction of a turbine system 100 is shown according to embodiments of the invention. Turbine system 100, as shown in FIG. 3 may be a conventional gas turbine system. However, it is understood that turbine system 100 may be configured as any conventional turbine system (e.g., steam turbine system) configured to generate power. As such, a brief description of the turbine system 100 is provided for clarity. As shown in FIG. 3, turbine system 100 may include a compressor 102, combustor 104 fluidly coupled to compressor 102 and a turbine 106 fluidly coupled to combustor 104 for receiving a combustion product from combustor 104. Turbine 106 may also be coupled to compressor 102 via shaft 108. Shaft 108 may also be coupled to a generator 110 for creating electricity during operation of turbine system 100.

During operation of turbine system 100, as shown in FIG. 3, compressor 102 may take in air and compress the inlet air before moving the compressed inlet air to combustor 104. Once in combustor 104, the compressed air may be mixed with a combustion product (e.g., fuel) and ignited. Once ignited, the compressed air-combustion product mixture is converted to a hot pressurized exhaust gas (hot gas) that flows through turbine 106. The hot gas flows through turbine 106, and specifically, passes over a plurality of rotating blades 112 (e.g., stages of blades) coupled to shaft 108, which rotates blades 112 and shaft 108 of turbine system 100. Additionally, the hot gas passes over a plurality of stator nozzles 114 (e.g., stages of stator nozzles) coupled to a casing 116 of turbine 106, where each stage of stator nozzles 114 corresponds to and may be positioned between each of the plurality of blades 112. Stator nozzles 114 may aid in directing the hot gas through turbine 106 to continuously pass over, and subsequently rotate each stage of the plurality of blades 112 of turbine 106 and shaft 108. As shaft 108 of turbine system 100 rotates, compressor 102 and turbine 106 are driven and generator 110 may create power (e.g., electric current).

Figure 4:
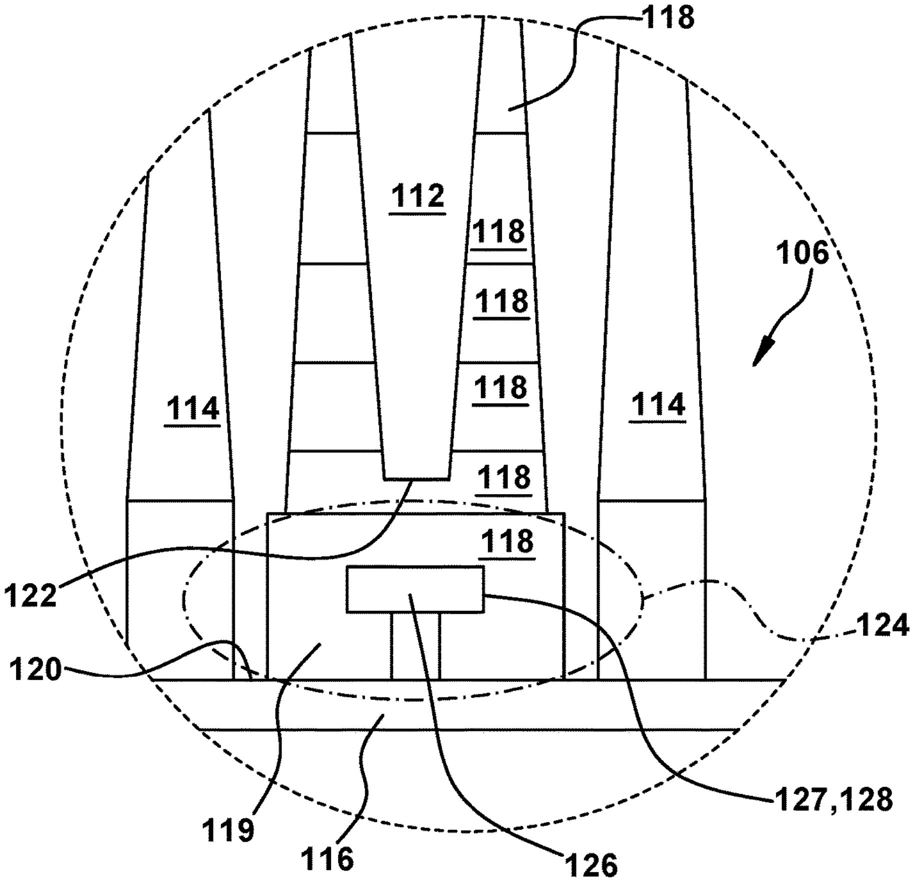
FIG. 4 shows an enlarged cross-sectional view of a portion of a gas turbine in FIG. 3.

Turning to FIG. 4, a cross-sectional view of a portion of turbine 106 of FIG. 3 is shown according to embodiments of the invention. As shown in FIG. 4, turbine 106 may also include a plurality of turbine shrouds or turbine shroud blocks 118 (hereafter "turbine shrouds 118") coupled to casing 116 and disposed circumferentially around an inner surface 120 of casing 116. That is, as shown in FIG. 4, the plurality of turbine shrouds 118 may be coupled to inner surface 120 of casing 116 and may be positioned adjacent a tip 122 of blade 112. Additionally, the plurality of turbine shrouds 118 may be positioned between the various stages of stator nozzles 114 and are also coupled to casing 116 of turbine 106. The plurality of turbine shrouds 118 may be circumferentially coupled to and positioned within casing 116 to provide an outer boundary for hot gas as it flows through turbine 106. That is, the plurality of turbine shrouds 118 may be positioned within casing 116 to substantially prevent hot gas from flowing into a region 124, where the hot gas may not flow through turbine 106 and come in contact with the various stages of blades 112 and/or stator nozzles 114. When the hot gas of turbine 106 flows into region 124, the hot gas may not drive the various stages of blades 112 of turbine 106, which ultimately decreases the efficiency and/or the power output generated within turbine system 100 (FIG. 3). Each stage of turbine system 100 may include a plurality or set of turbine shrouds 118 that are sized and shaped for the location of a respective stage. Any number of turbine shrouds 118 may be used in a given set, e.g., depending on circumferential extent of each turbine shroud 118 and the size of the given stage. Hence, turbine system 100 may have a first set of turbine shrouds 118 having a first dimension, i.e., for a given stage, and at least one second set of turbine shrouds 118 having a second, different dimension than the first set, i.e., for one or more other stages. Handling system 150, as will be described, may provide different sized parts thereof to handle the differently sized turbine shrouds 118 for a given turbine system 100, and even a fleet of different turbine systems 100.

As shown in FIG. 4, inner surface 120 of casing 116 may include a connection component 126 configured to couple the plurality of turbine shrouds 118 of a given set of shrouds to casing 116 of turbine 106. More specifically, casing 116 may include a male connection component 126 configured to engage a female opening 127 define in curved body 119 of each of the plurality of turbine shrouds 118 for coupling the plurality of turbine shrouds 118 to casing 116. As shown in FIG. 4, connection component 126 may be positioned substantially in line with blades 112 and may be positioned between the various stages of stator nozzles 114 of turbine 106. Connection component 126 may be a continuous component positioned circumferentially around casing 116, such that each of the plurality of turbine shrouds 118 may be slidingly engaged or coupled to connection component 126 and subsequently positioned circumferentially around casing 116.

As shown in FIG. 1, turbine shroud 118 may have a curved body 119 in which slot 128 is formed, e.g., using wire EDM or additive manufacturing. In certain embodiments, slot 128 can be curved. That is, female opening 127 may take the form of curved slot 128 that is curved along its length to generally parallel a curvature of curved body 119 of turbine shroud 118. Slot 128 (hereafter "curved slot 128") is also referred to as a hook. For purposes of description, as shown in FIGS. 1 and 4, male connection component 126 and curved slot 128 are shown as T-shaped. Although shown as a male T-shape connection component 126 for mating with a female T-shape curved slot 128, the plurality of turbine shrouds 118 may include various alternative shapes for coupling the plurality of turbine shrouds 118 to casing 116. For example, the plurality of turbine shrouds 118 may include a female cross-shaped opening 127 (not shown, i.e., a cross-shaped curved slot 128) and connection component 126 of casing 116 may include a male cross-shaped connection configured to substantially receive the female connection portion of turbine shrouds 118 for coupling the plurality of turbine shrouds 118 to casing 116 of turbine 106. Any variety of differently shaped mating connection components 126 and curved slots 128 shaped to receive and/or retain turbine shroud(s) 118 therein may be used.

Turbine shrouds 118 generally have a first end portion 172 and a second, opposing end portion 174. Turbine shrouds 118 can vary in a number of ways depending on the given turbine system 100 in which used, and the stage of turbine 106 in which used. For example, an overall size (radial, axial and/or circumferential extent) and weight of each turbine shroud 118 can vary to accommodate the given stage and/or given turbine 106. Also, a curvature of body 119 and curvature of curved slot 128 may vary to accommodate the given stage and/or given turbine system. In addition, as previously described, a shape and/or size of curved slot 128 may vary. As will be described further, FIGS. 6, 13A-D, 14A-D and 15A-D show different dimensioned turbine shrouds 118.

Figure 5:
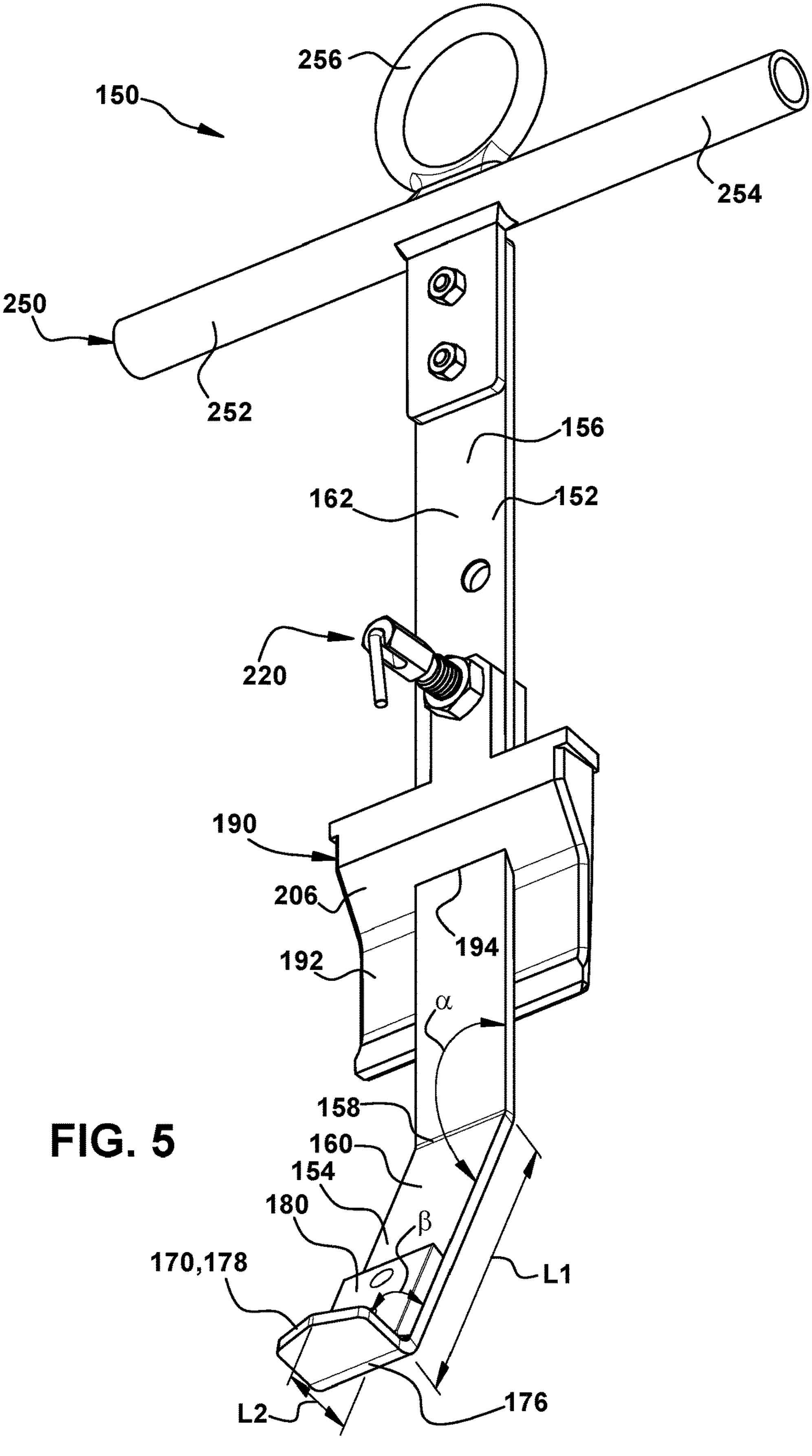
FIG. 5 shows a front view of a handling system for a turbine shroud, according to embodiments of the disclosure.
Figure 6:
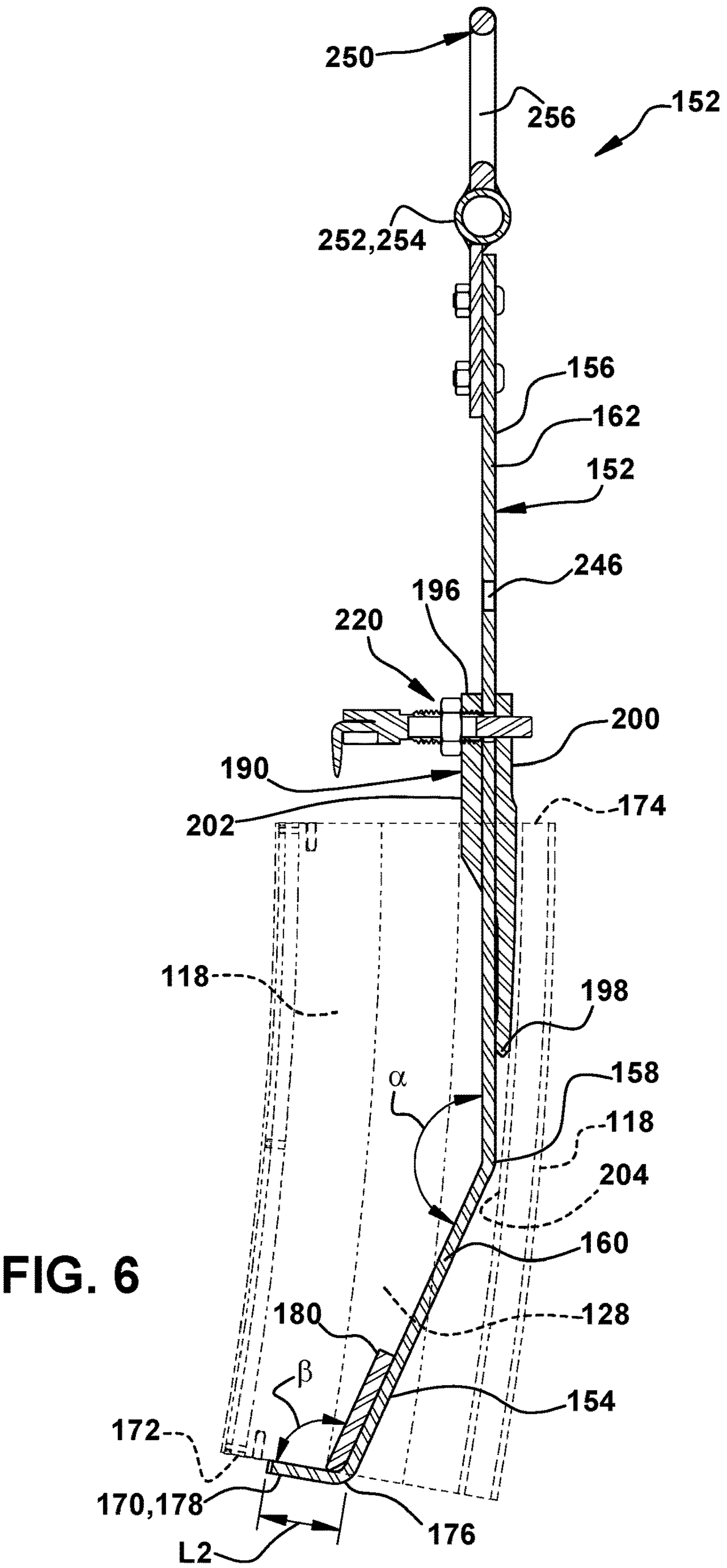
FIG. 6 shows a cross-sectional view of a handling system operationally coupled to an illustrative turbine shroud, according to embodiments of the disclosure.

FIG. 5 shows a front view of a handling system 150 for turbine shroud 118 having curved slot 128 (FIG. 1) apart from turbine shroud 118, according to embodiments of the disclosure. FIG. 6 shows a handling system 150 operationally coupled in a handling position on an illustrative turbine shroud 118, according to embodiments of the disclosure.

Figure 7A:
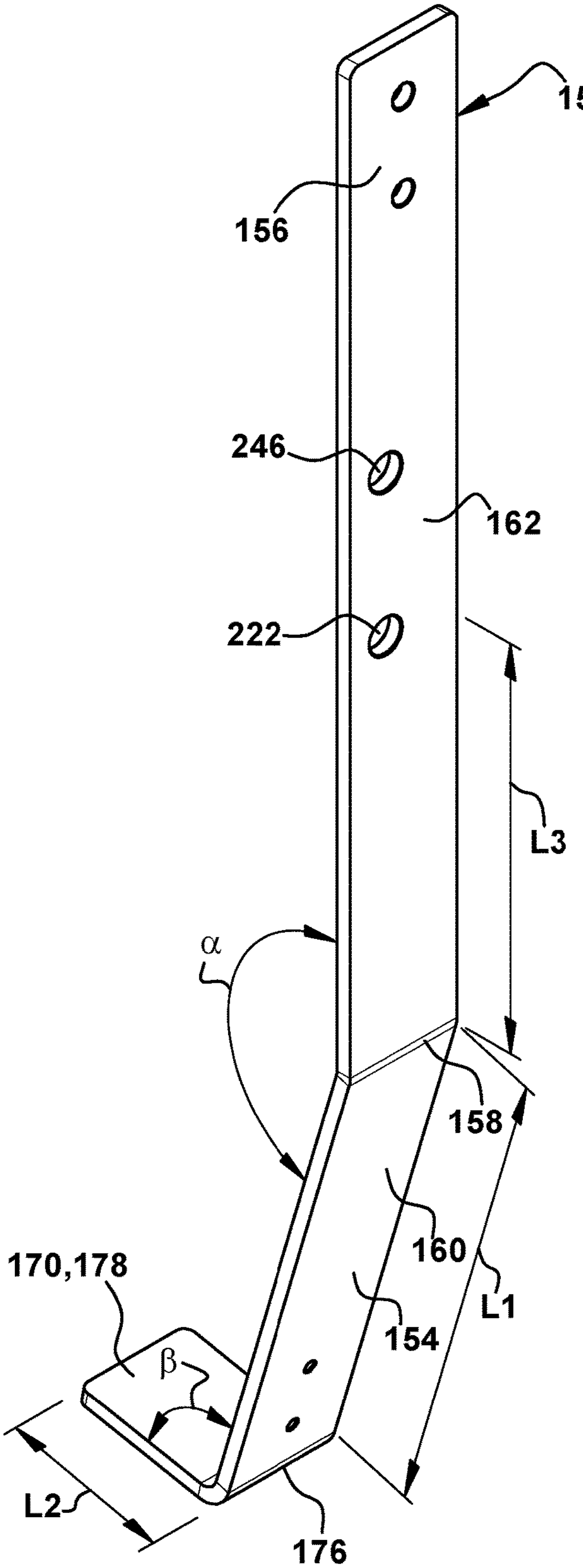
FIG. 7A-B show perspective views of illustrative elongated members for different handling systems, according to embodiments of the disclosure.
Figure 7B:
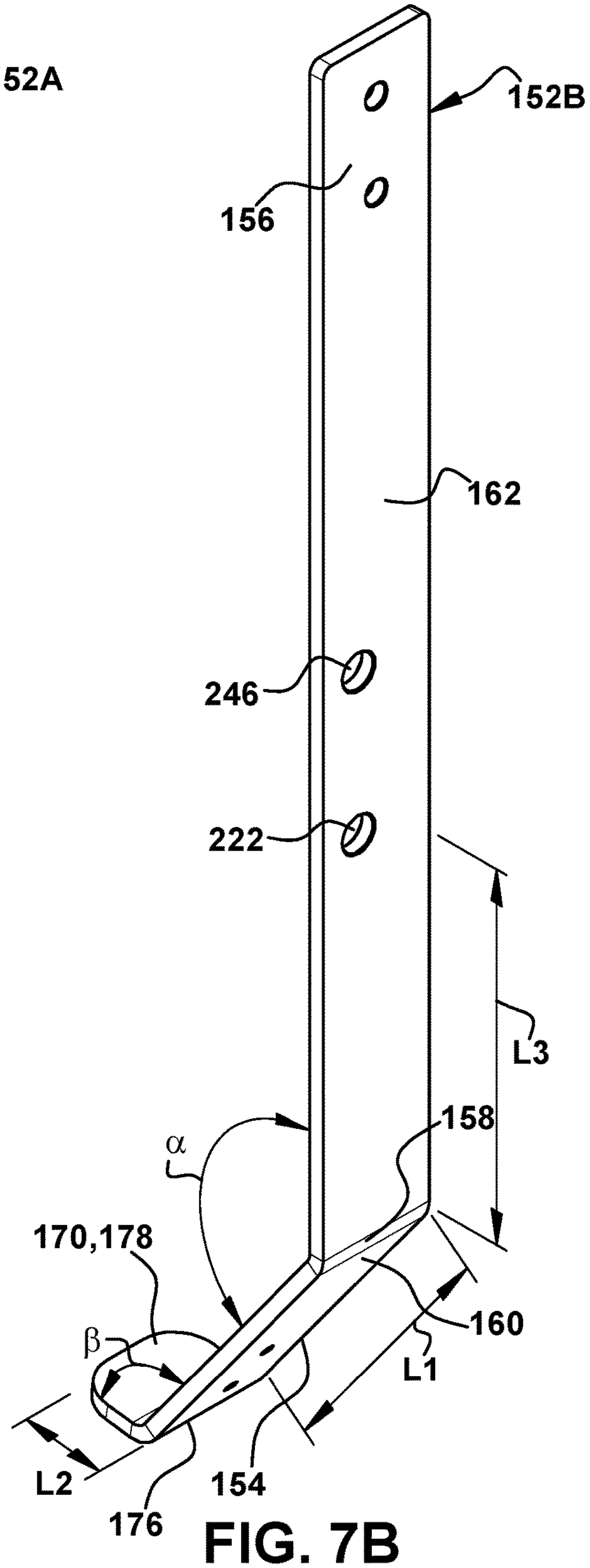

Handling system 150 includes an elongated member 152 including a first end 154 and a second end 156. FIGS. 7A-B show perspective views of a couple examples of elongated member 152A, 152B having different configurations. Elongated member 152 also includes a first bend 158 therein, i.e., between first end 154 and second end 156. As shown in FIG. 6, elongated member 152 is configured to be positioned in curved slot 128 of turbine shroud 118. To this end, first bend 158 may have an angle α. Bend 158 segments elongated member 152 into a first, upper portion 162 and a second, lower portion 160. As will be described, length L1 of lower portion 160 and angle α may be configured to allow elongated member 152 to pass through curved slot 128 in different sized and shaped turbine shrouds 118. Length L1 of lower portion 160 and angle α may also be configured to allow elongated member 152 of handling system 150 to securely grasp turbine shroud 118 in a handling position thereof.

Handling system 150 also includes a base retention member 170 extending from first end 154 of elongated member 152 to engage and retain first end portion 172 of turbine shroud 118 on elongated member 152. As noted, turbine shroud 118 also has second end portion 174 at an opposing end of turbine shroud 118. Base retention member 170 extends from elongated member 152 by an angle β. Base retention member 170 may include any element capable of engaging first end portion 172 of turbine shroud 118. More particularly, base retention member 170 allows lifting of turbine shroud 118 with elongated member 152, i.e., it prevents turbine shroud 118 from further movement off of or away from elongated member 152. In certain embodiments, base retention member 170 may be a separate element coupled to elongated member 152, e.g., through welding, fasteners, etc. However, in certain embodiments, base retention member 170 includes a second bend 176 in elongated member 152, creating base retention member 170 from a third portion 178 of elongated member 152. Hence, base retention member 170 may be integral with the rest of elongated member 152 and is bent at a non-linear angle β relative to elongated member 152 so as to extend from the rest of elongated member 152. In this embodiment, second bend 176 has angle β, i.e., between base retention member 170 and (lower portion 160 of) elongated member 152. Hence, base retention member 170 extends from elongated member 152 by an angle β. As will be described, base retention member 170 has a length L2 that is sized to allow base retention member 170 to be able to move through curved slot 128 unhindered but engage end portion 172 of turbine shroud 118 and to handle the shroud.

Handling system 150 may also optionally include a spacing member 180 coupled to elongated member 152 adjacent base retention member 170. Spacing member 180 can be selectively shaped and sized to ensure proper positioning of base retention member 170 and the rest of elongated member 152 relative to turbine shroud 118 in the handling position (FIG. 6). While spacing member 180 is coupled to lower portion 160 of elongated member 152, other locations are possible, e.g., on base retention member 170. Spacing member 180 may be coupled using any form of connection, e.g., removable fasteners such as threaded fasteners (bolts, screws) or rivets, or permanent fasteners such as welds, or a combination thereof. Spacing member 180 can be replaced during the lifetime of handling system 150 to continue to ensure proper positioning of base retention member 170 and elongated member 152 relative to turbine shroud 118 despite wear on handling system 150. For example, wear on elongated member 152, base retention member 170 and/or spacing member 180, may occur during use. Spacing member 180 may be made of the same material as elongated member 152 and/or base retention member 170, or may alternatively, include a softer, wear resistant material, such as a plastic.

Figure 8B:
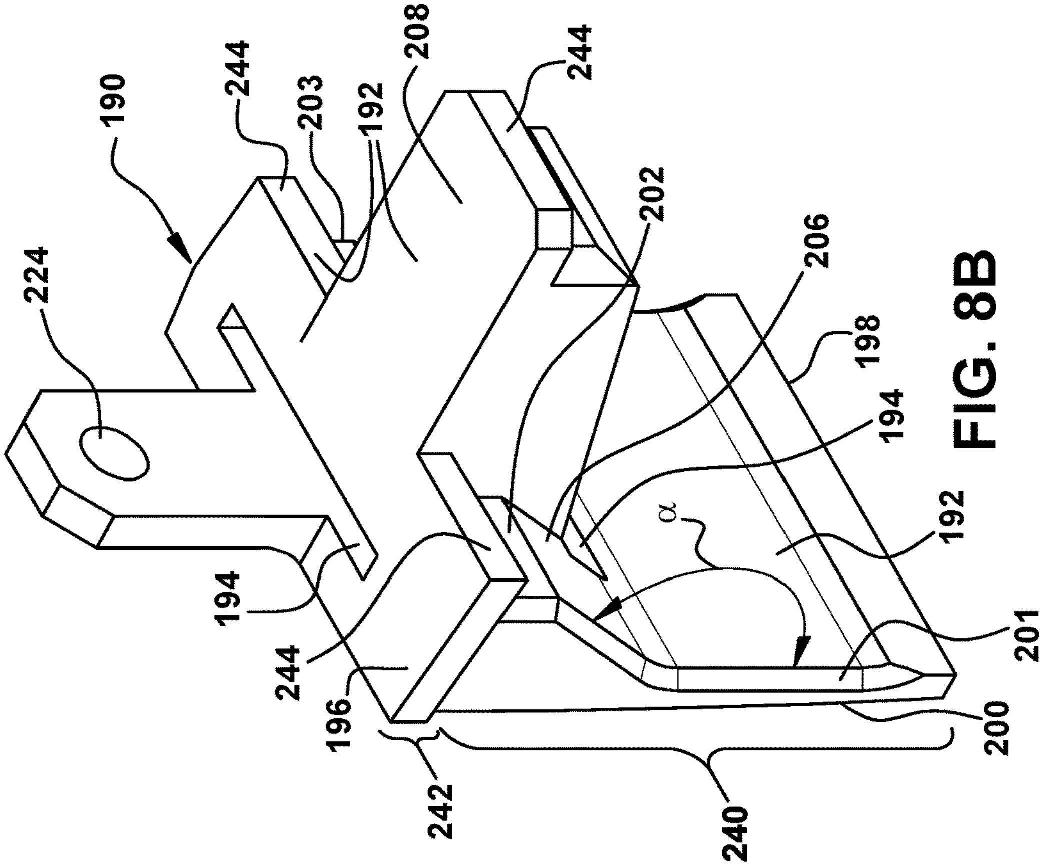
FIGS. 8A-B show perspective views of illustrative sliding retainers for different handling systems, according to embodiments of the disclosure.
Figure 8A:
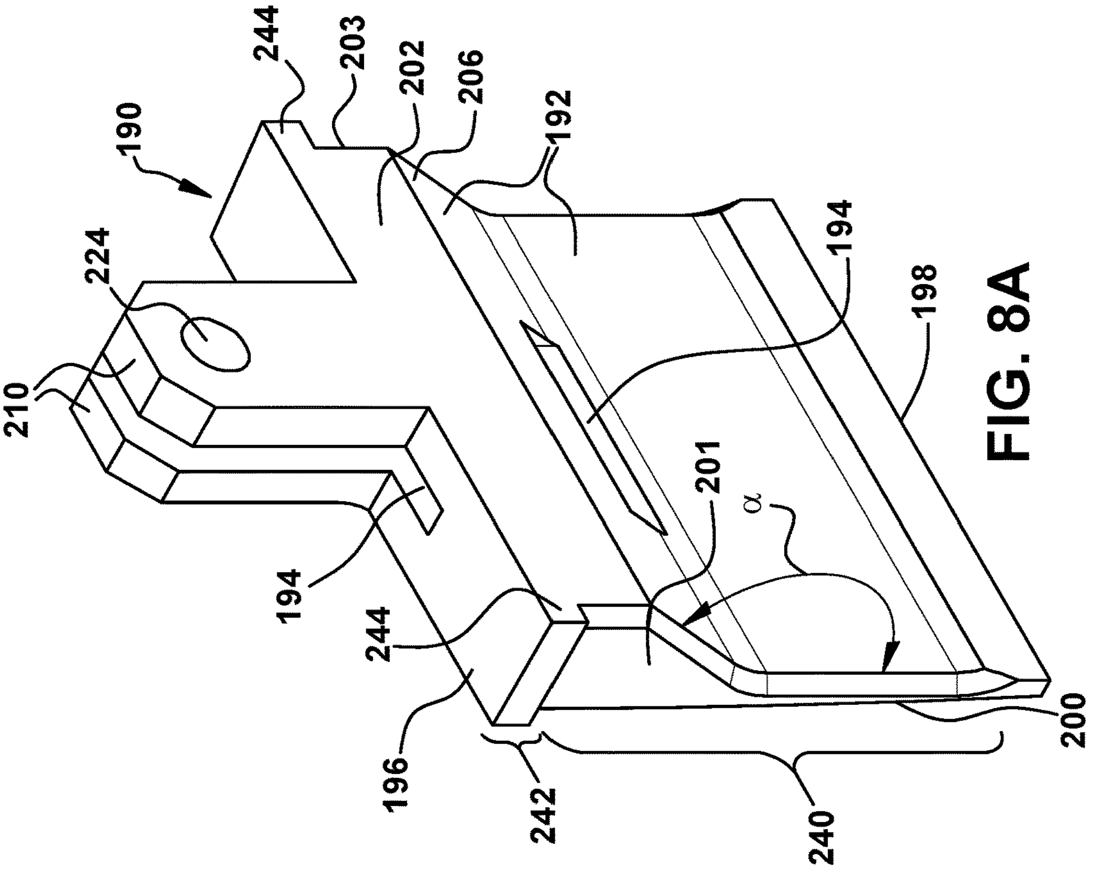
Figure 9:
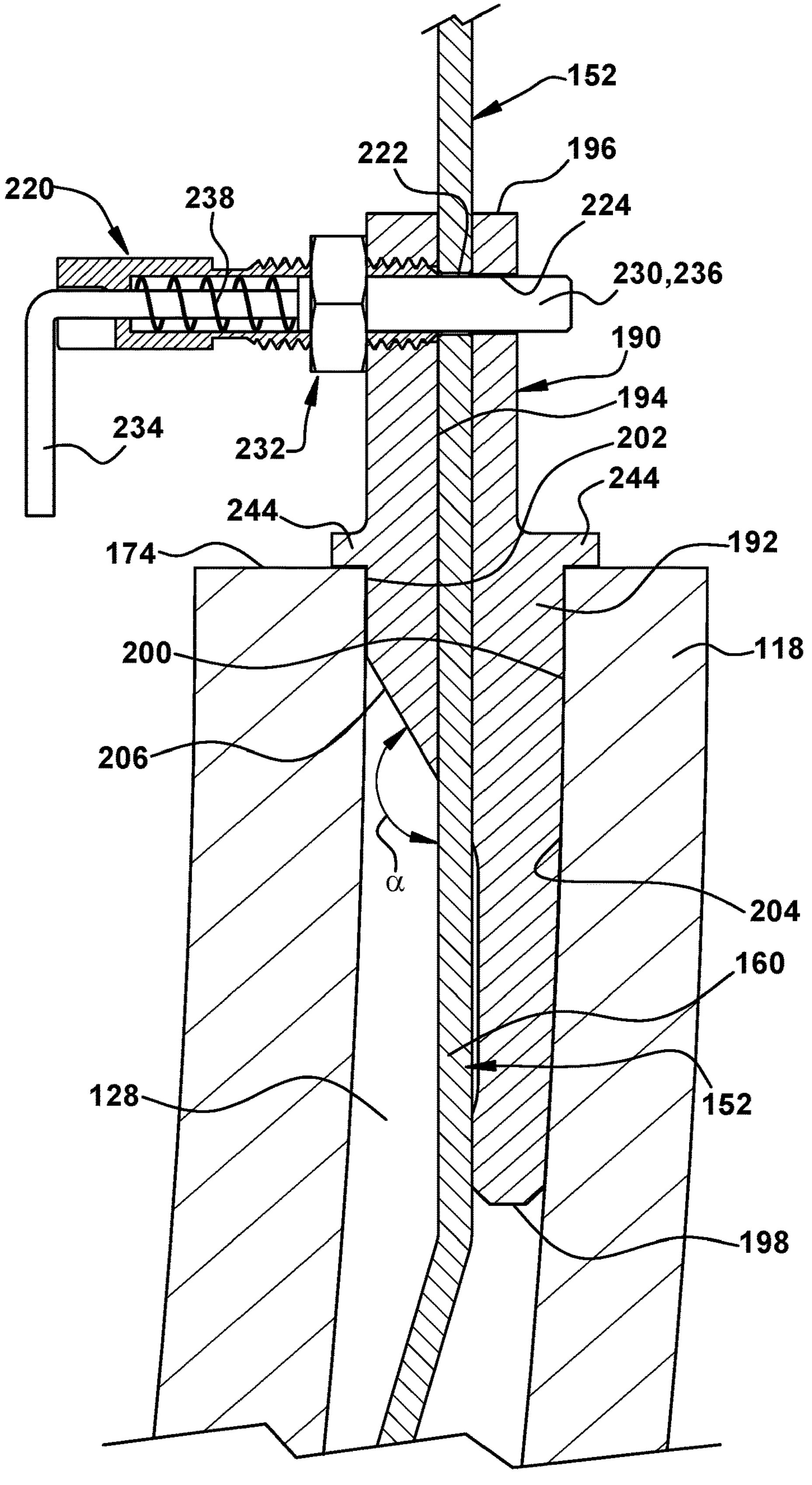
FIG. 9 shows a cross-sectional view of a sliding retainer on an elongated member of the handling system in a locked position and a handling position, according to embodiments of the disclosure.

Handling system 150 includes a sliding retainer 190 including a body 192 having an opening 194 configured to slidingly receive elongated member 152. FIGS. 8A-B show perspective views of sliding retainers 190, and FIG. 9 shows an enlarged cross-sectional view of sliding retainer 190 in a handling position, according to embodiments of the disclosure. As will be described, body 192 of sliding retainer 190 is configured to slidingly engage in curved slot 128 and selectively retain a second end portion 174 of turbine shroud 118 in a handling position on elongated member 152. Further, sliding retainer 190 and body 192 thereof are configured (e.g., shaped and sized) to locate sliding retainer 190 relative to curved slot 128, locate elongated member 152 relative to curved slot 128 and/or ensure secure grasping of turbine shroud 118 in the handling position. The handling position is shown in, for example, FIGS. 6 and 9. Opening 194 may have a cross-section having a shape and size to allow elongated member 152, and more particular, upper portion 162 thereof to slide freely therein. That is, sliding retainer 190 can slide along elongated member 152. Opening 194 need not have the exact same cross-sectional shape as elongated member 152.

With further regard to FIGS. 8A-B and FIG. 9, sliding retainer 190 also includes a first, upper end 196, a second, lower end 198, a first side 200 and a second side 202. Sliding retainer 190 may also include a third side 201 and a fourth side 203. First and second sides 200, 202 do not necessarily extend the same distance from each upper end 196. For example, in FIGS. 8A-B and 9, first side 200 of sliding retainer 190 may extend (vertically as shown) farther from upper end 196 of sliding retainer 190 than second side 202 of sliding retainer 190 extends from upper end 196. In other embodiments, the sides 200, 202 may extend the same distance from upper end 196. As will be described further, and as shown in FIGS. 6 and 9, first side 200 of sliding retainer 190 engages a same inner surface 204 of curved slot 128 of turbine shroud 118 as first bend 158 of elongated member 152.

In certain embodiments, sliding retainer 190 may have a cross-sectional shape configured to mate with curved slot 128 at second end portion 174 of turbine shroud 118. However, a mating configuration is not necessary in all cases so long as sliding retainer 190 properly locates itself relative to curved slot 128, locates elongated member 152 relative to curved slot 128 and/or ensures secure grasping of turbine shroud 118. (See, e.g., FIG. 13C for an embodiment in which sliding retainer 190 does not have a cross-section to match curved slot 128 at second end portion 174 of turbine shroud 118).

With reference to FIGS. 8A-B, sliding retainer 190 may also optionally include a variety of positioning structures to locate sliding retainer 190 relative to curved slot 128, locate elongated member 152 relative to curved slot 128 and/or ensure secure grasping of turbine shroud 118. In certain embodiments, for example, second side 202 of sliding retainer 190 may also optionally include a ramped surface 206 extending other than 90° from elongated member 152 (shown in FIG. 9). Ramped surface 206 may assist in directing sliding retainer 190 into curved slot 128. Ramped surface 206 may also position first side 200 of sliding retainer 190 against inner surface 204 of curved slot 128, which may also position elongated member 152 in a desired location in curved slot 128, i.e., in a desired location for securely grasping turbine shroud 118. In certain embodiments, an angle γ of ramped surface 206 relative to elongated member 152 may be, for example, in a range of 15° to 45°. In another embodiment, an angle γ of ramped surface 206 relative to elongated member 152 may be, for example, about 30°. In another example, with reference to FIG. 8B, sliding retainer 190 may optionally include an extension 208 from second side 202 configured to position sliding retainer 190 within curved slot 128, e.g., by engaging an inner surface of curved slot opposing inner surface 204. More particularly, extension 208 may position first side 200 of sliding retainer 190 against inner surface 204 of curved slot 128, which may also position elongated member 152 in a desired location in curved slot 128, i.e., in a desired location for securely grasping turbine shroud 118 in the handling position. Extension 208 may also optionally include additional protrusion(s) 244 to abut second end portion 174 of turbine shroud 118. While certain examples of sliding retainer 190 shapes and positioning structures have been described herein (e.g., in FIGS. 8A-B), it is emphasized that sliding retainer 190 may have a number of other structures and/or shapes depending on the shape of curved slot 128, e.g., its cross-sectional shape, which can vary widely depending on the form of connection component 126 (FIG. 4).

Figure 10C:
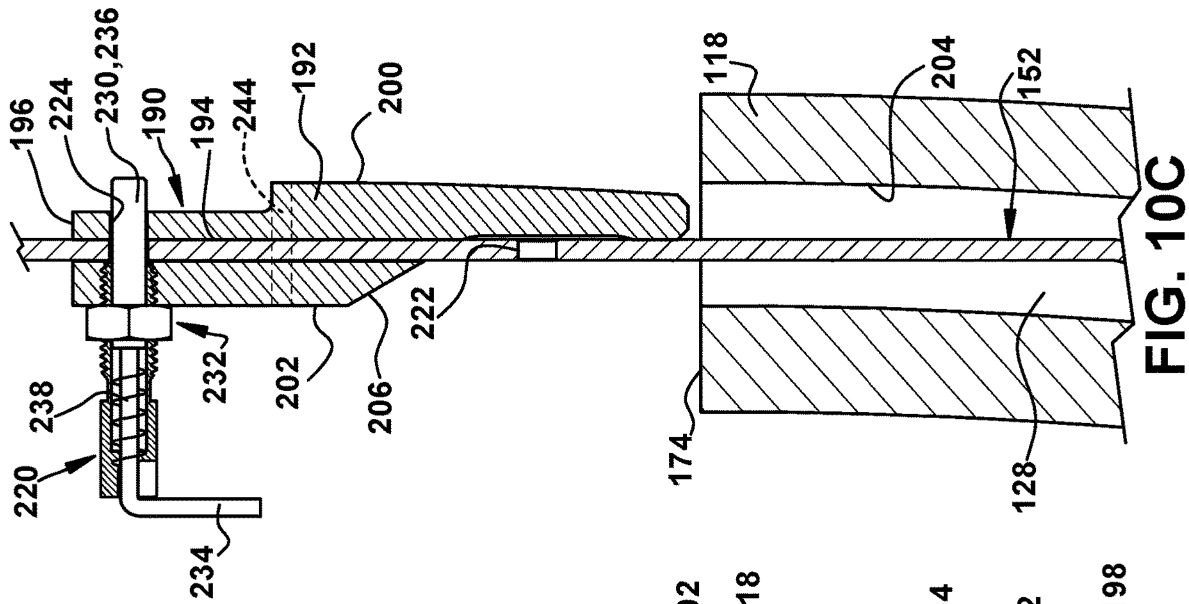
FIGS. 10A-C show enlarged cross-sectional views of a sliding retainer locked in a handling position, unlocked in the handling position, and in a stored position, respectively, according to embodiments of the disclosure.
Figure 10B:
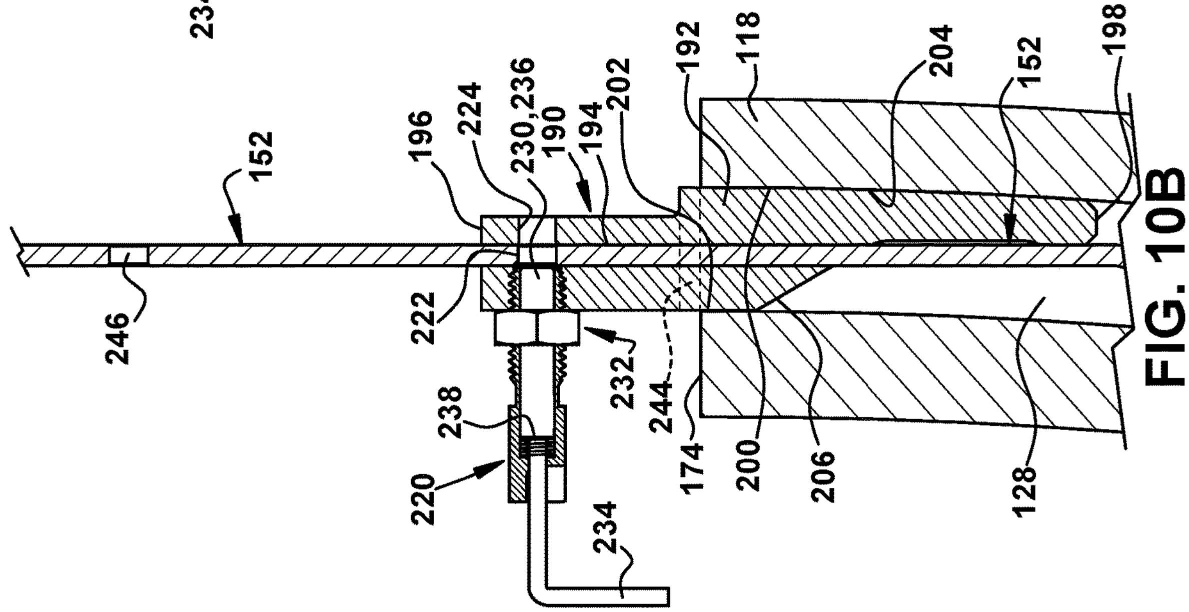
Figure 10A:
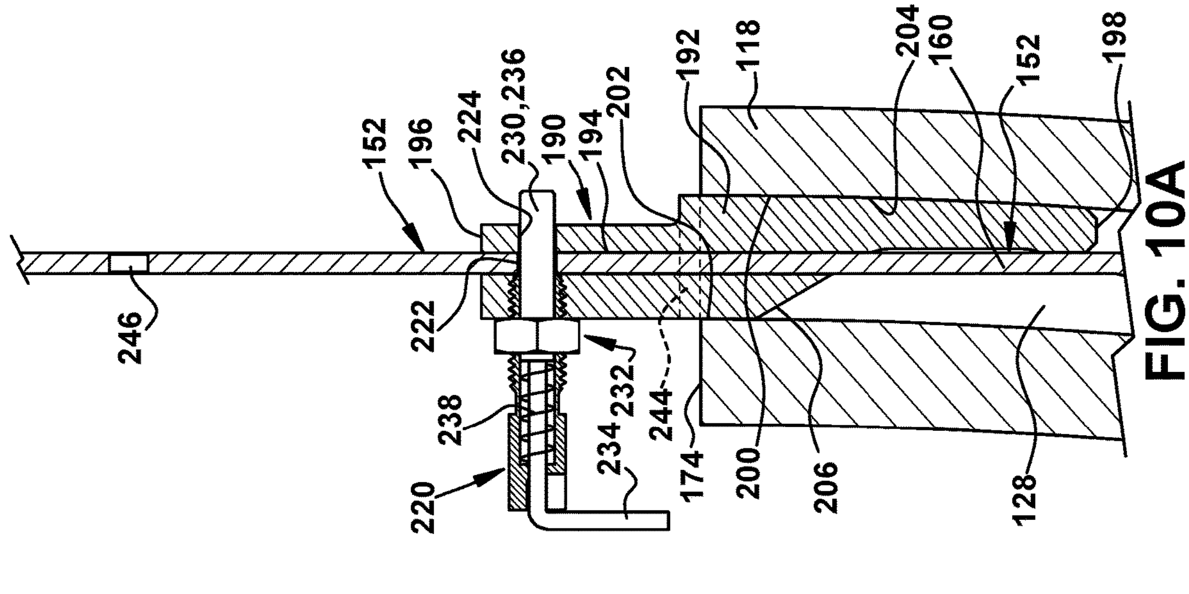

Handling system 150 also includes a lock 220 coupled to sliding retainer 190. Lock 220 is shown in FIGS. 6 and 9, and FIGS. 10A-C show enlarged cross-sectional views of lock 220 on sliding retainer 190. Lock 220 is coupled to sliding retainer 190 and is selectively movable between a first locked position, as shown in FIG. 10A, in which the lock retains sliding retainer 190 in the handling position (FIGS. 6 and 9) and an unlocked position, as shown in FIG. 10B, in which sliding retainer 190 can slide freely on elongated member 152 (see vertical arrow in FIG. 10B-C). FIG. 10C shows lock 220 in an optional second locked position with sliding retainer 190 in a retracted (and stored) position—where sliding retainer 190 is retracted out of curved slot 128 of turbine shroud 118 and locked in a stored position.

Lock 220 may include any mechanism capable of selectively locking sliding retainer 190 from moving along elongated member 152 in a safe manner. Lock 220 can be coupled to sliding retainer 190 in any manner, e.g., welding, threaded fasteners, etc. In certain embodiments, lock 220 may include an element, such as a threaded element (e.g., screw or bolt), ratchet system, a cotter pin, or another member, capable of selective positioning sliding retainer 190 relative to elongated member 152. In certain embodiments, lock 220 includes a member configured to extend through a first opening 222 in elongated member 152 and a second opening 224 in body 192 of sliding retainer 190. In certain embodiments, as shown in FIGS. 5, 6, and 10A-C, lock 220 may include a pin 230 selectively movable between the first locked position of FIG. 10A in which pin 230 extends through first opening 222 in elongated member 152 and retains sliding retainer 190 in the handling position (FIG. 6), and the unlocked position of FIG. 10B, in which pin 230 is retracted from (moved out of) first opening 222 in elongated member 152 and allows sliding retainer 190 to slide freely on elongated member 152.

In other embodiments, lock 220 and, more particularly, pin 230, may include a spring-loaded pin system 232 coupled to sliding retainer 190. In this case, a plunger 234 of spring-loaded pin system 232 may be moved, as shown in FIG. 10B, to retract a pin 236 thereof from first opening 222 in elongated member 152 against the bias of a spring 238 thereof, allowing sliding retainer 190 to slide freely on elongated member 152. Alternatively, plunger 234 of spring-loaded pin system 232 may be released, as shown in FIG. 10A, to allow pin 236 of spring-loaded pin system 232 to be forced by the bias of spring 238 into first opening 222 in elongated member 152, preventing sliding retainer 190 from slidingly moving along elongated member 152 and holding sliding retainer 190 in the handling position against second end portion 174 of turbine shroud 118. Spring-loaded pin system 232 may be any now known or later developed spring-loaded pin such as those available from McMaster-Carr Company of Elmhurst, IL. Regardless of the form of lock 220, as will be further described, openings 222 and 224 are positioned such that sliding retainer 190 is in the handling position (FIG. 6) to retain turbine shroud 118 from moving relative to elongated member 152.

While opening 224 in sliding retainer 190 is shown in one side of a forked member 210 in most drawings (FIG. 8A) of sliding retainer 190, as shown in FIG. 8B, sliding retainer 190 may use just a single member for providing opening 224.

In certain embodiments, when not in the handling position shown in FIGS. 6, 9 and 10A, sliding retainer 190 is free to slide on upper portion 162 of elongated member 152. In this case, sliding retainer 190 may be manually held by a user at a desired location on elongated member 152. In other embodiments, elongated member 152 may include a third opening 246 for locking sliding retainer 190 in a second locked, retracted and stored position (hereafter “stored position”). FIG. 10C shows pin 230, 236 in a locked position in third opening 246 with sliding retainer 190 in the stored position. In the stored position, sliding retainer 190 is moved up along upper portion 162 of elongated member 152 away from curved slot 128 of turbine shroud 118, and locked in position. In this optional embodiment, elongated member 152 may include third opening 246 therethrough that is spaced sufficiently from first opening 222 that when pin 230, 236 extends from lock 220 into third opening 246, sliding retainer 190 is positioned to be completely removed from turbine shroud 118 and curved slot 128 thereof. In FIG. 10C, pin 230, 236 is positioned in opening 246 in elongated member 152 spaced from first opening 222 with sliding retainer 190 in the stored position. Again, where third opening 246 is not provided, sliding retainer 190 may slide freely on elongated member 152 with pin 230, 236 either held in a retracted position or riding along the surface of elongated member 152.

In certain embodiment, body 192 of sliding retainer 190 alone may have a sufficiently tight mating arrangement with curved slot 128 of turbine shroud 118 in the handling position, as shown in for example in FIG. 6, to securely retain (grasp) second end portion 174 of turbine shroud 118 and maintain it in the handling position on elongated member 152. Here, lock 220 also assists in maintaining sliding retainer 190 in the handling position. In other embodiments, as shown in FIGS. 8A-B and 9, body 192 of sliding retainer 190 may have a first portion 240 having a shape and size configured to slidingly engage in curved slot 128, and a second portion 242 larger than first portion 240 and configured to abut second end portion 174 of turbine shroud 118 to selectively retain second end portion 174 of turbine shroud 118 in the handling position on elongated member 152. Here, lock 220 maintains sliding retainer 190 in the handling position. First portion 240 can have any cross-sectional shape configured to fit into curved slot 128 within second end portion 174 of turbine shroud 118, e.g., rectangular, T-shaped, cross-shaped, etc. In this regard, first portion 240 does not need to have the same cross-sectional shape as curved slot 128, but it may be advantageous for proper alignment. Second portion 242 may have any shape capable of stopping further entry of sliding retainer 190 into curved slot 128 adjacent second end portion 174. In the non-limiting example shown, second portion 242 includes protrusions 244 that abut second end portion 174. As shown in FIG. 8A, protrusions 244 may extend from sides 201, 203 of body 192 (parallel to sides 200, 202 of body 192), or as shown in FIG. 9, protrusions 244 may extend from sides 200, 202 of body 192, or as shown in FIG. 8C, protrusions 244 may protrude from all four sides 200, 201, 202, 203 of body 192. Any arrangement of second portion 242 preventing sliding retainer 190 from passing past the desired handling position, shown in FIGS. 6 and 9, and further into curved slot 128 is possible.

Referring to FIGS. 5 and 6, handling system 150 may also include a handle 250 coupled to second end 156 of elongated member 152. Handle 250 can take any form capable of grasping by a user and/or lifting equipment such as a crane hook, forklift, robotic arm, etc. In the non-limiting example shown, handle 250 may include a pair of opposing bar handles 252, 254 for grasping by hand, and a lifting element 256, e.g., ring or other structure, for coupling to desired lifting equipment, e.g., an overhead crane. In some cases, turbine shroud 118 has a sufficiently low weight that a human user can safely handle turbine shroud 118 with handling system 150 attached thereto, e.g., less than 22 kilograms (50 pounds). In this case, the user can use bar handles 252, 254 to handle turbine shroud 118. As used herein, "handle" indicates any movement, e.g., lift, turn, rotate, linearly move, etc. In other cases, turbine shroud 118 may have a weight where lifting equipment is advisable or necessary, e.g., greater than 22 kilograms (50 pounds). In this case, lifting equipment can be coupled to lifting element 256 to handle turbine shroud 118 in any manner, e.g., hook into ring, robotic grasping arm, among many other formats.

Handle 250 can be coupled to elongated member 152 in any manner to allow safe and secure movement, e.g., threaded fasteners, welds, integral formation with elongated member 152, etc. Where desired, handle 250 can be made removable, so different handles 250 can be used with a given elongated member 152. Further, different handles 250 may be used for different turbine shrouds 118. For example, handling systems 150 may be provided with handles 250 without lifting bars 252, 254 where the handling systems 150 are configured for use with heavier turbine shrouds 118 that always require lifting equipment. In this case, handling systems 150 may be provided with handles 250 that dictate whether human or lifting equipment is required—preventing, for example, accidental handling of turbine shrouds 118 that are too heavy for human users. In addition, handling systems 150 may be provided with handles 250 that require use of a specific type of lifting equipment, such as an overhead crane, preventing accidental use of the incorrect lifting equipment, such as a forklift.

Figure 11:
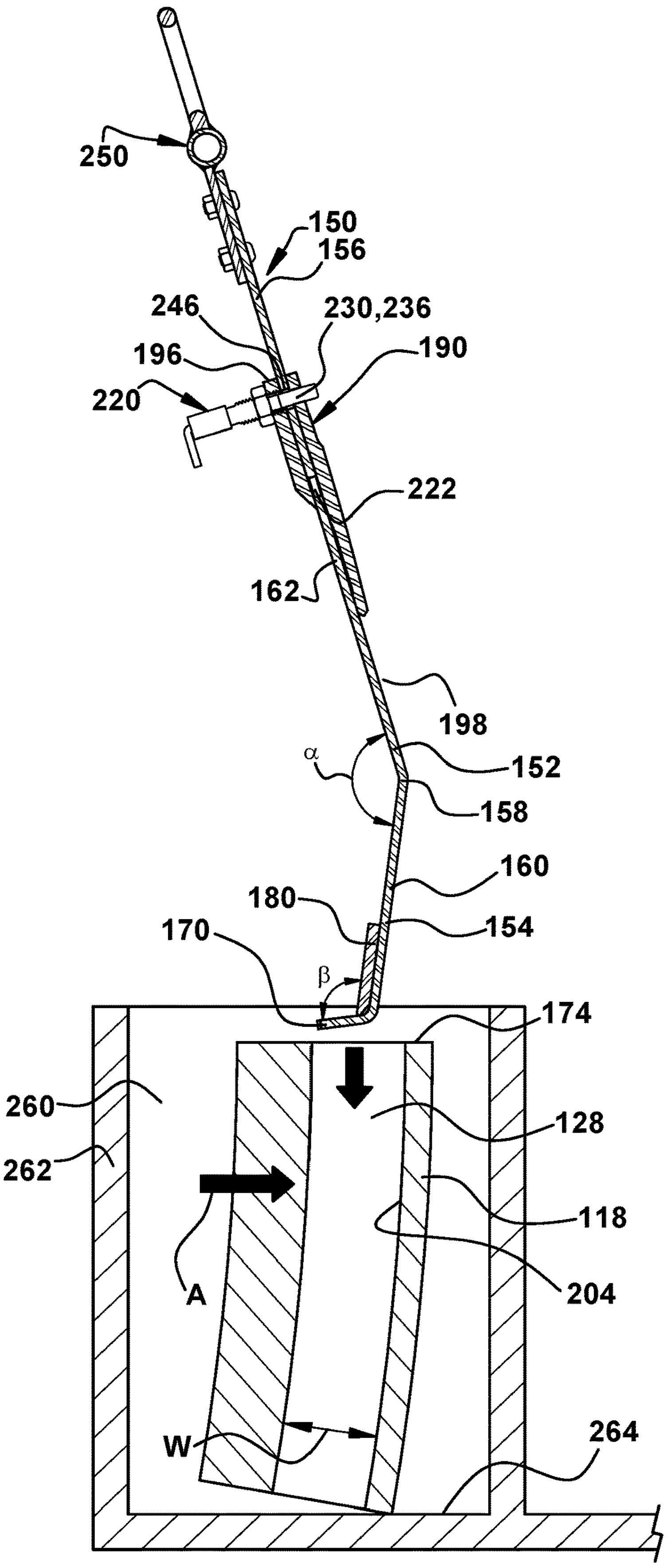
FIG. 11 shows a cross-sectional view of a handling system in an initial position for coupling to a turbine shroud, according to embodiments of the disclosure.
Figure 12:
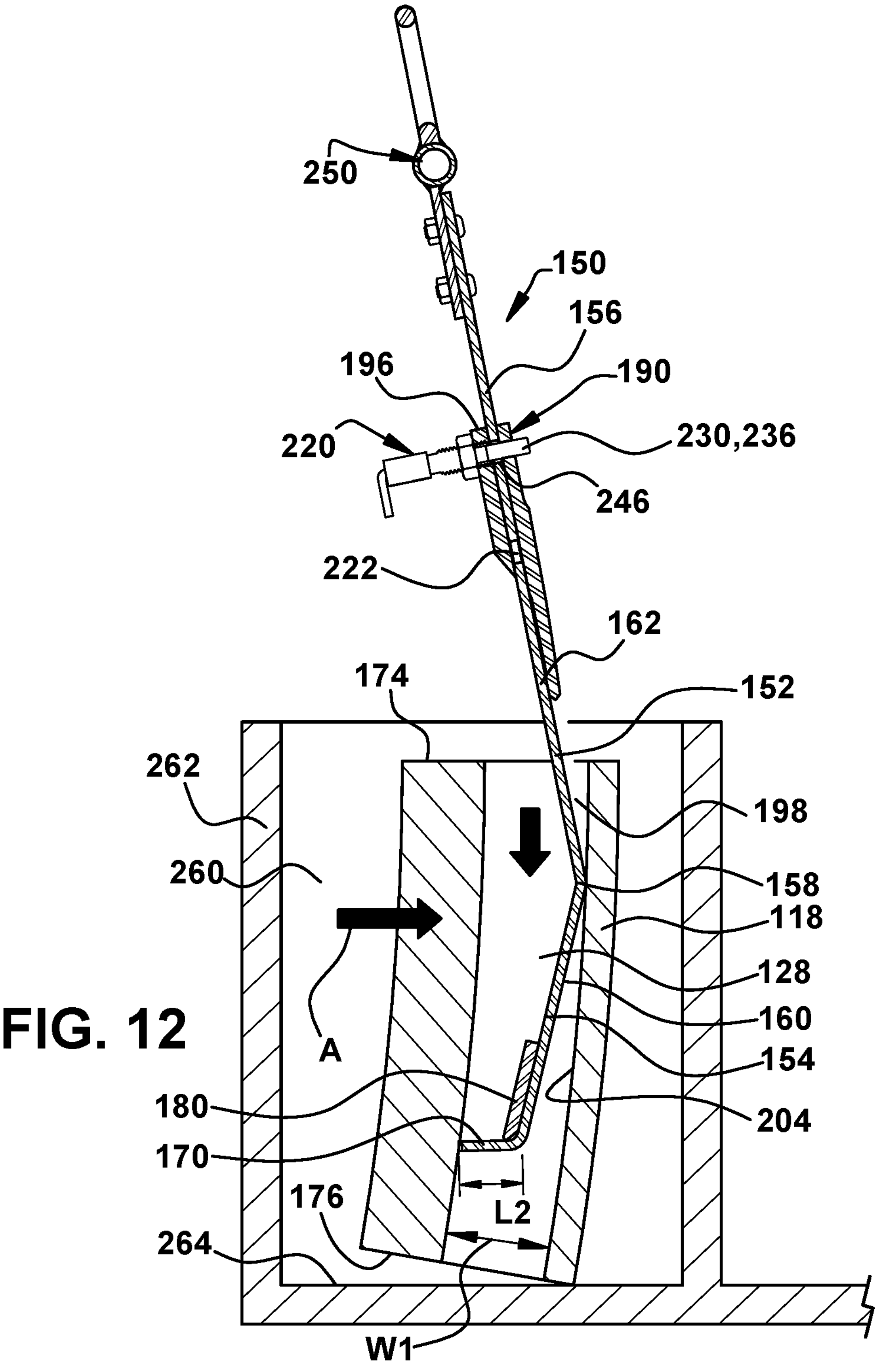
FIG. 12 shows a cross-sectional view of positioning the handling system in the slot of a turbine shroud, according to embodiments of the disclosure.
Figure 13B:
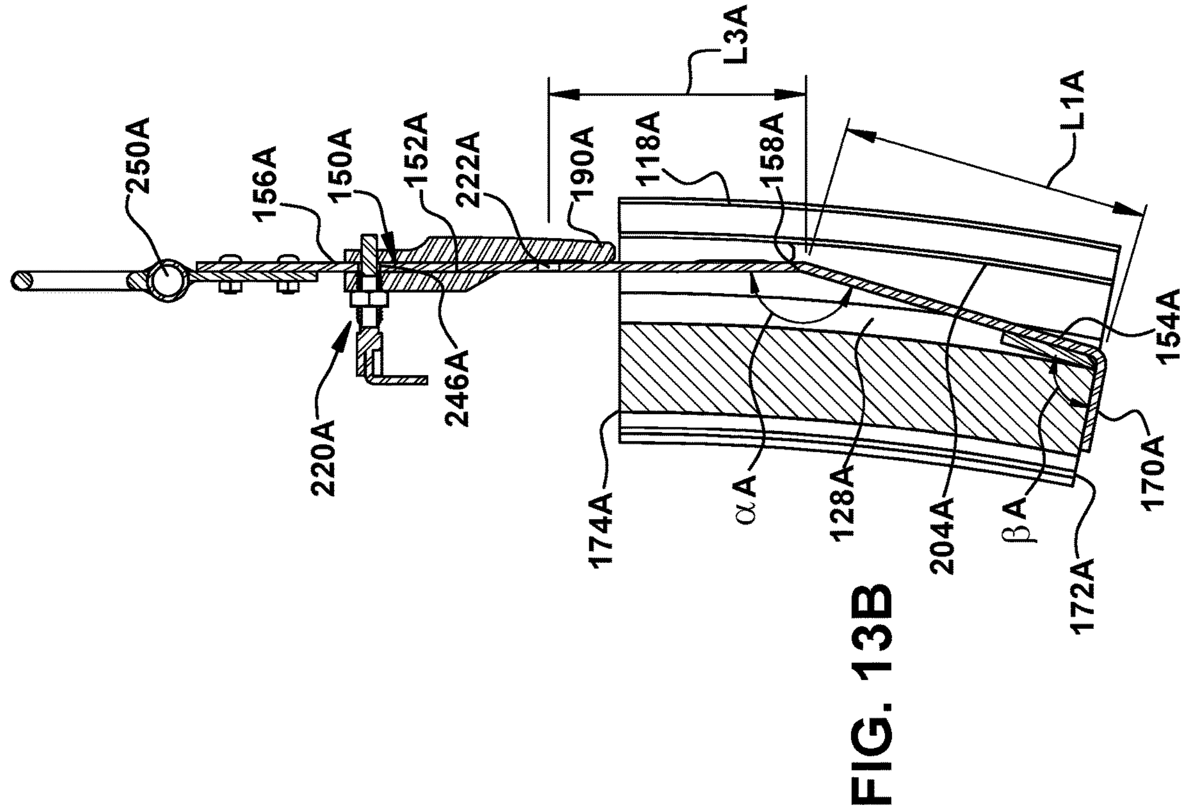
FIGS. 13A-D show various views of an illustrative handling system for a particular set of turbine shrouds, according to embodiments of the disclosure.
Figure 13A:
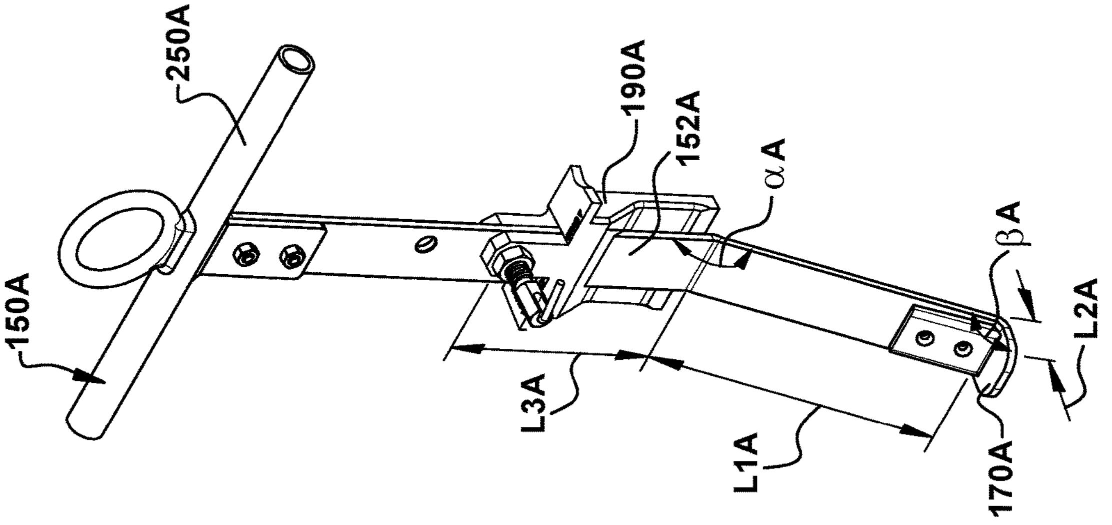
Figure 13D:
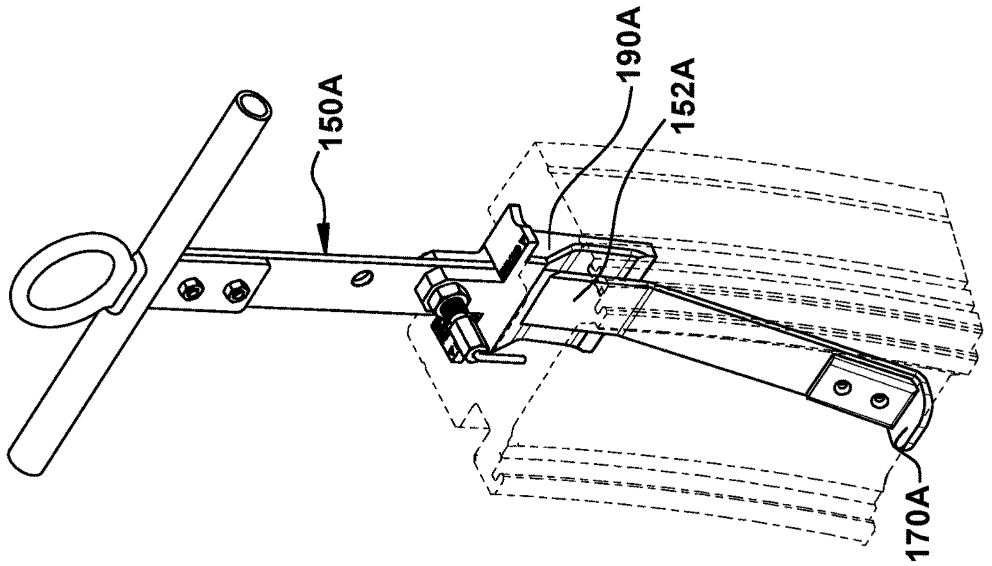
Figure 13C:
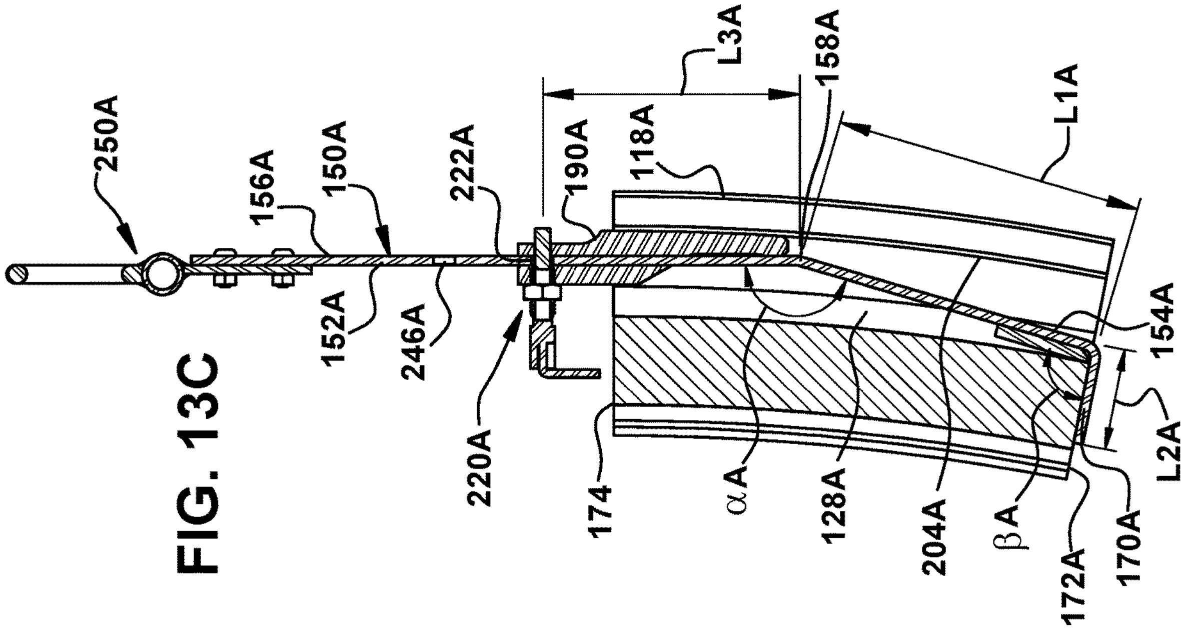
Figure 14B:
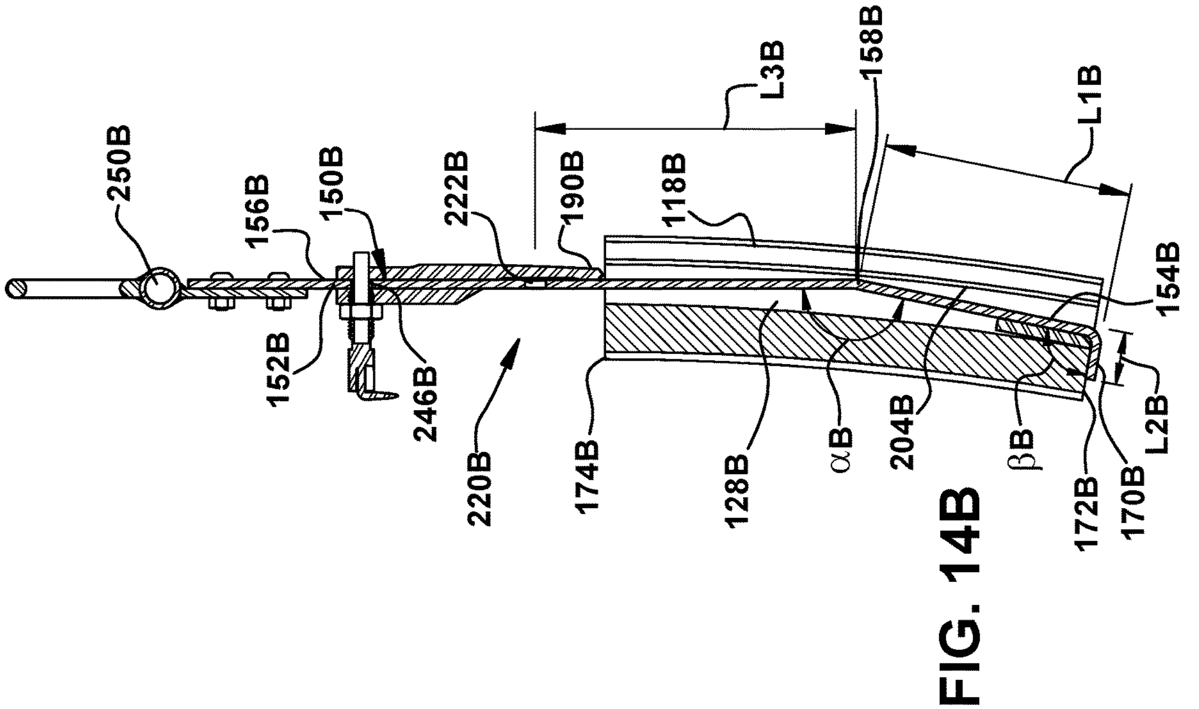
FIGS. 14A-D show various views of an illustrative handling system for a different set of turbine shrouds than FIGS. 13A-D, according to embodiments of the disclosure.
Figure 14A:
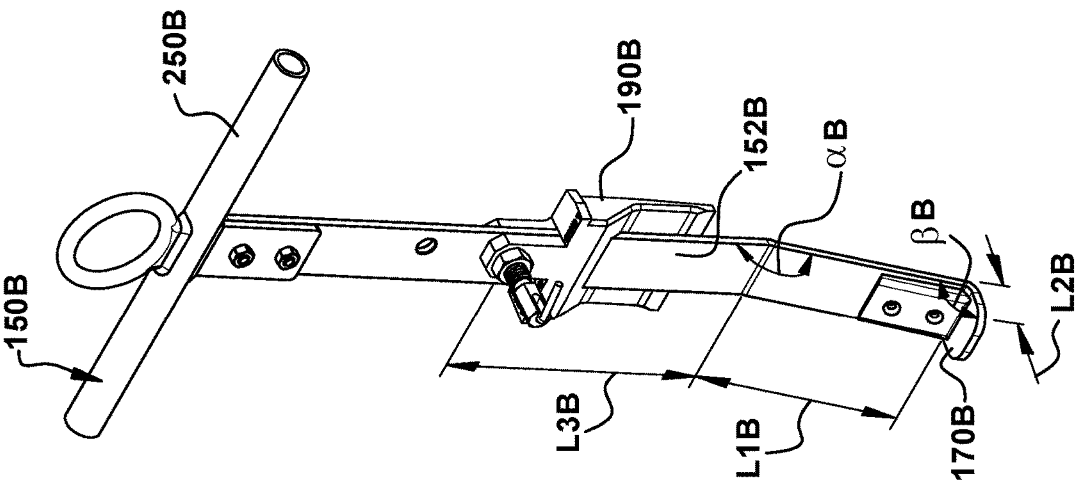
Figure 14D:
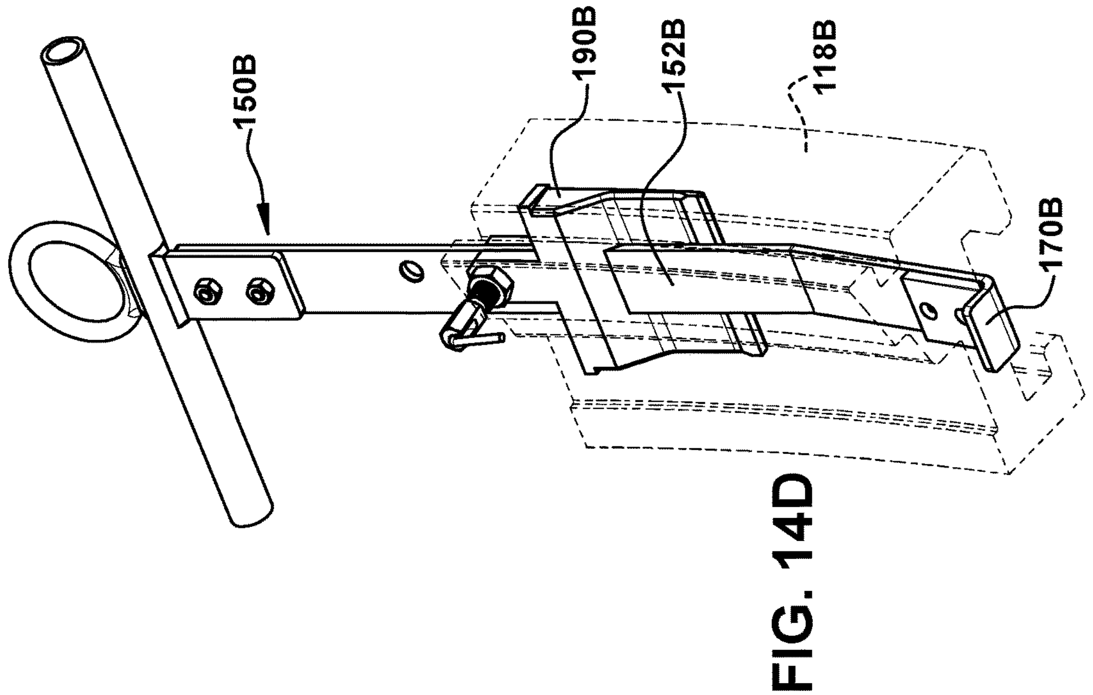
Figure 14C:
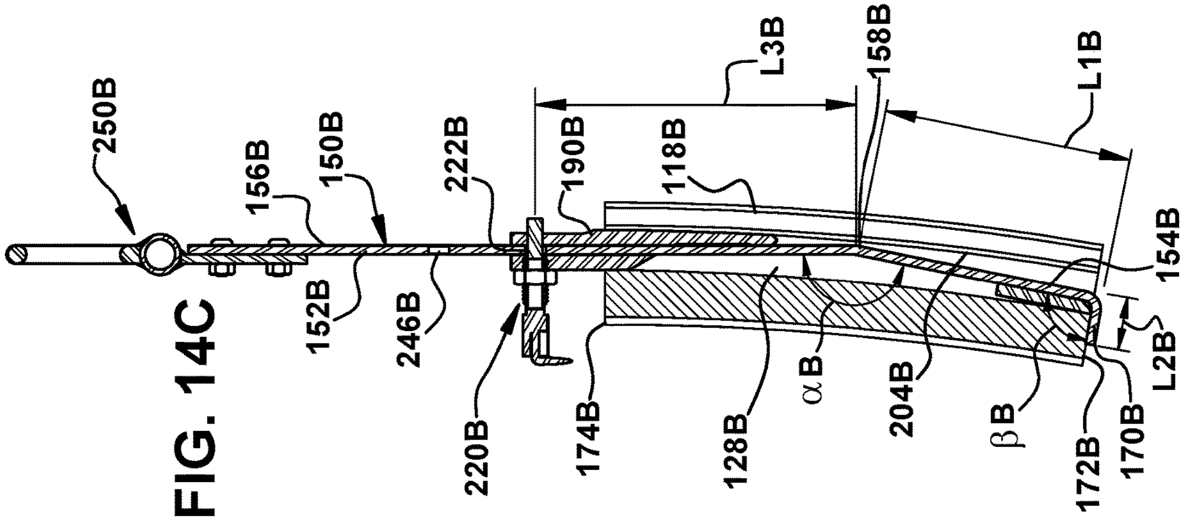
Figure 15B:
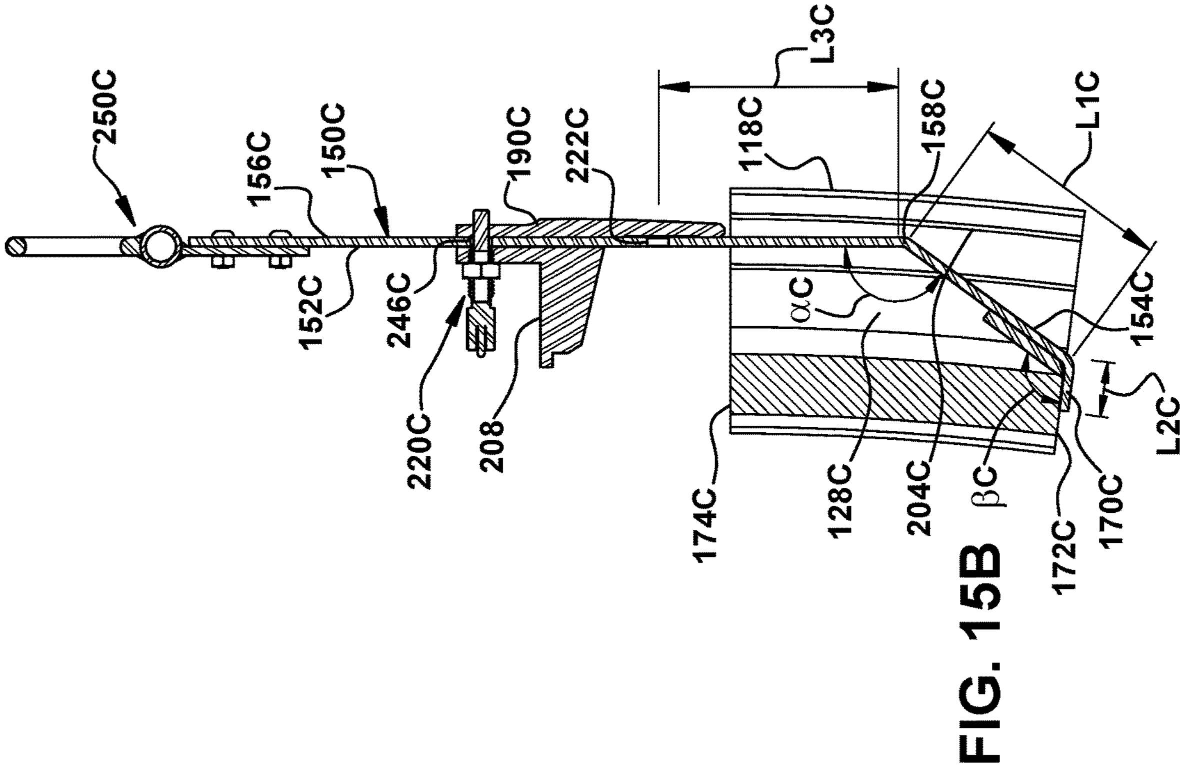
FIGS. 15A-D show various views of an illustrative handling system for another different set of turbine shrouds than FIGS. 13A-D and FIGS. 14A-D, according to embodiments of the disclosure.
Figure 15A:
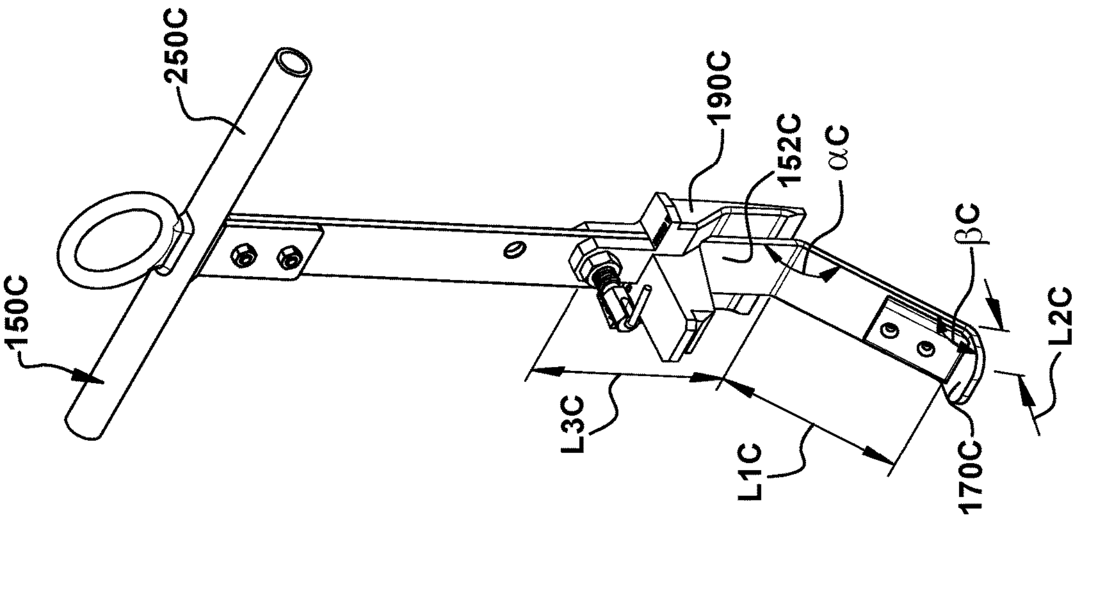
Figure 15D:
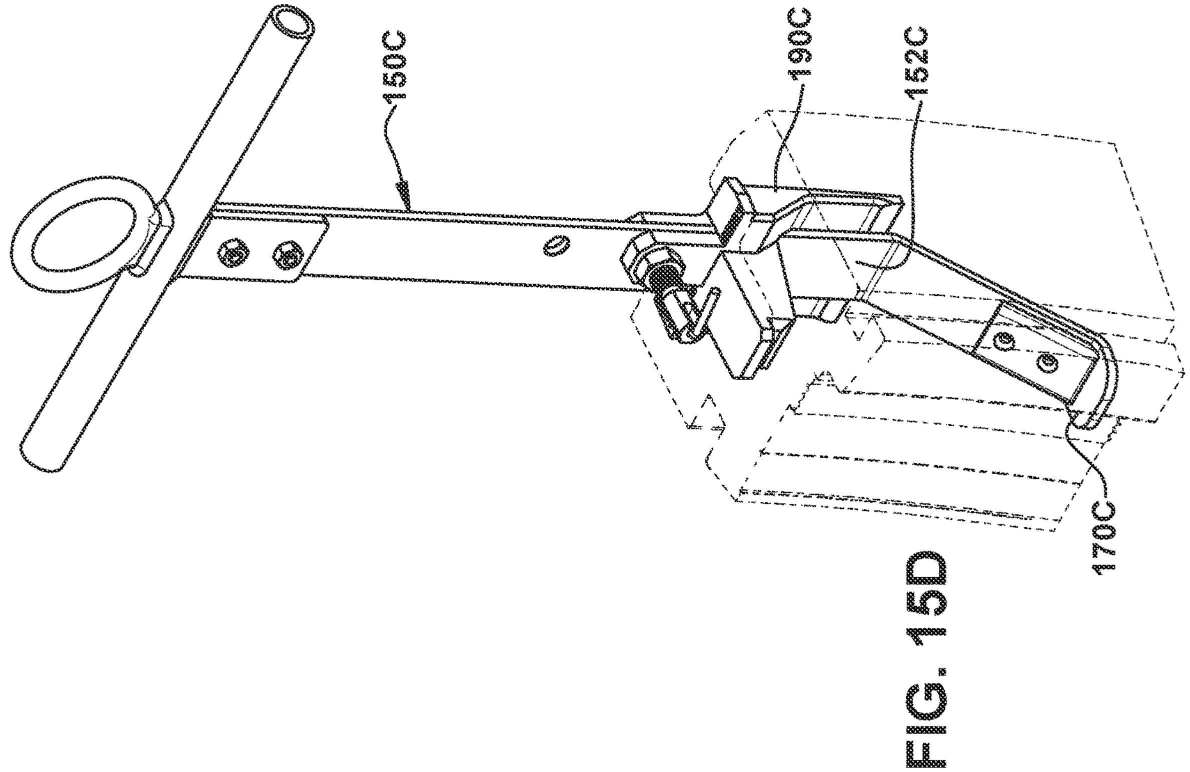
Figure 15C:
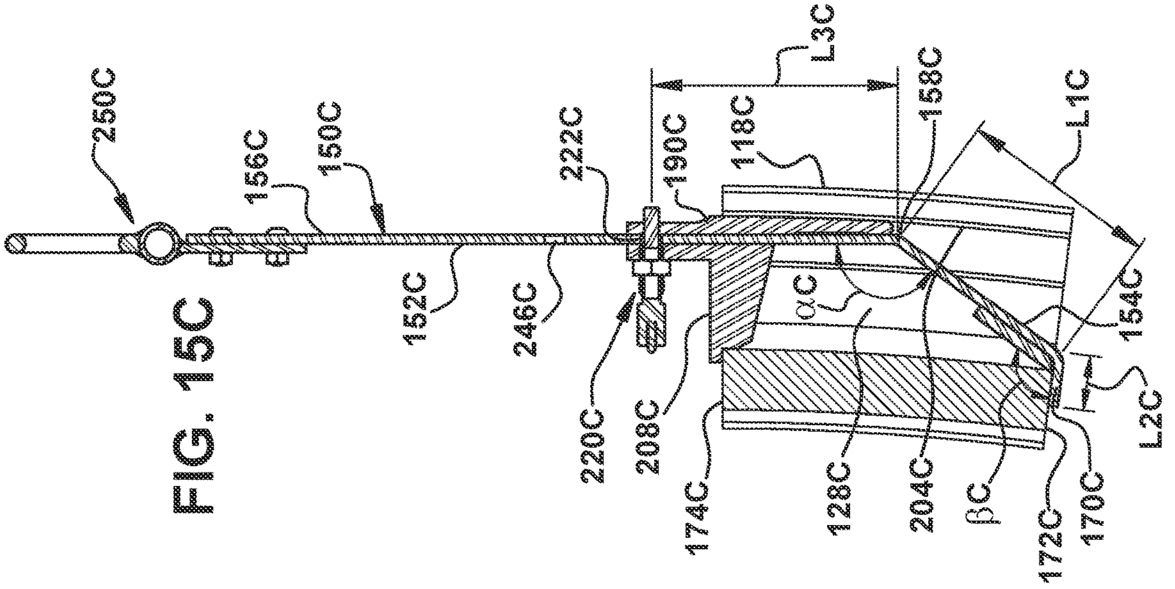

Referring to FIGS. 6, 11 and 12, operation of handling system 150 to grasp a turbine shroud 118 having curved slot 128, will now be described.

FIG. 11 shows initially positioning handling system 150 over a turbine shroud 118 to be lifted using handling system 150. As understood in the field, turbine shrouds 118 are oftentimes located in hard to access locations, e.g., within a casing 116 (FIG. 4) of a turbine 106 (FIG. 3) of a turbine system 100, or as shown in FIG. 11, within a pocket 260 of a tight-fitting transportation container 262. Advantageously, handling system 150 does not require access to all of turbine shroud 118, but merely an end portion (such as second end portion 174) to be used. In this manner, handling system 150 can be readily coupled in an ergonomic and safe manner to a turbine shroud 118 even when the shroud is in difficult to access locations FIG. 12 shows positioning elongated member 152 in curved slot 128 of turbine shroud 118. As noted, elongated member 152 includes first end 154, second end 156, and first bend 158 between first end 154 and second end 156. Further, base retention member 170 extends from first (lower) end 154 of elongated member 152 for engaging and retaining first end portion 172 of turbine shroud 118 on elongated member 152. As noted, base retention member 170 has a length L2 (extending from lower portion 160 of elongated member 152) that is sized to allow base retention member 170 to move through curved slot 128 unhindered. That is, base retention member 170 has length L2 sized to ensure it can move through curved slot 128—length L2 is less than a width W1 of curved slot 128. A shape of base retention member 170 can also be configured to ensure unhindered movement through curved slot 128. During positioning, as shown in FIG. 12, first bend 158 also allows elongated member 152 to move through curved slot 128. During the positioning, as shown in FIGS. 11 and 12, sliding retainer 190 is slid up elongated member 152 out of the way of turbine shroud 118. Sliding retainer 190 may be manually held out of the way, or it may be locked in the stored position as shown in FIG. 10C.

FIG. 6 shows handling system 150 after further movement (positioning) to the handling position. During a transition to the handling position, elongated member 152 is moved (clockwise and to the right as illustrated in FIGS. 6 and 12) to move first bend 158 relative to inner surface 204 of curved slot 128 of turbine shroud 118. More particularly, first bend 158 in elongated member 152 is configured to engage inner surface 204 of curved slot 128 and position base retention member 170 to engage and retain first end portion 172 of turbine shroud 118 on elongated member 152. As first bend 158 contacts inner surface 204, base retention member 170 also moves into engagement under first end portion 172 of turbine shroud 118. When base retention member 170 is engaged with first end portion 172 of turbine shroud 118, any vertical movement of handling system 150 will cause turbine shroud 118 to be lifted.

A number of aspects of elongated member 152 are configured to ensure proper movement through curved slot 128 and positioning in the handling position in a manner that base retention member 170 is engaged with and retains first end portion 172 of turbine shroud 118. For example, a length L1 (FIGS. 7A-B) of lower portion 160 of elongated member 152 and angle β in first bend 158 in elongated member 152 are set to ensure that when elongated member 152 is moved into the handling position, base retention member 170 engages first end portion 172 as shown in FIG. 6. In addition, a length L2 of base retention member 170 and/or a size and/or shape of spacing member 180 are set to ensure that when elongated member 152 is moved into the handling position, base retention member 170 engages first end portion 172 as shown in FIG. 6. Spacing member 180 may also act as a wear surface to prevent damage to elongated member 152 or base retention member 170. As will be further described, a length L3 of elongated member 152 between first bend 158 and first opening 222 dictates a locked position for sliding retainer 190 and can be sized to ensure elongated member 152 is securely fastened to turbine shroud 118, during use.

Where necessary, during the positioning and moving to the handling position, turbine shroud 118 and/or handling system 150 may be tilted to allow base retention member 170 to pass through curved slot 128 and past first end portion 172 of turbine shroud 118. In the examples shown in FIGS. 11 and 12, turbine shroud 118 is tilted from having first end portion 172 lay flat on a bottom 264 of transportation container 262—see arrow A. In any event, during the positioning, base retention member 170 passes through curved slot 128 and past first end portion 172 thereof.

FIG. 6 also shows sliding the sliding retainer 190 along elongated member 152 and into curved slot 128 at second end portion 174 of turbine shroud 118 to the handling position thereof on elongated member 152. As described previously, and as shown in FIGS. 6 and 9, sliding retainer 190 may be configured to secure second end portion 174 to elongated member 152, e.g., via a tight fit and/or by abutting second end portion 174 of turbine shroud 118 in the handling position. More particularly, sliding retainer 190 is configured to enter curved slot 128 and position elongate member 152 in a spaced manner within curved slot 128 such that base retention member 170 is fixed engaging with first end portion 172. Further, first side 200 of sliding retainer 190 engages a same inner surface 204 of curved slot 204 of turbine shroud 118 of the respective set as the first bend 158 of the elongated member.

FIGS. 6, 9 and 10A show locking sliding retainer 190 in a locked position in which the sliding retainer 190 is fixed relative to elongated member 152 in the handling position and sliding retainer 190 grasps and retains turbine shroud 118 on elongated member 152. In the locked position, pin 230, 236 extends through first opening 222 in elongated member 152 to secure sliding retainer 190 in curved slot 128 and secure second end portion 174 of turbine shroud 118 to elongated member 152. As shown in FIGS. 7A-B, a length L3 of elongated member 152 between first bend 158 and first opening 222 dictates a locked position for sliding retainer 190 and can be sized to ensure elongated member 152 is securely fastened to turbine shroud 118, during use.

Once in the handling position, handling system 150 may be used to ergonomically and securely lift and handle turbine shroud 118 in any manner, e.g., by hand and/or using lifting equipment. Handling system 150 allows movement of turbine shroud 118 to be moved to practically any required location, such as but not limited to: installed on a turbine 106 (FIG. 3), positioned in pocket 260 of a transportation container 262 (FIGS. 11, 12), moved relative to a machining tool for (re)work on turbine shroud 118, or positioned in a large variety of alternative locations.

After use, lock 220 may be released to its unlocked position, and sliding retainer 190 may be slid out of curved slot 128 and out the handling position, e.g., as in FIG. 10C, along elongated member 152. Once sliding retainer 190 is moved, handling system 150 is no longer fully grasping turbine shroud 118, and elongated member 152 may be moved to allow base retention member 170 to be disengaged. That is, elongated member 152 may be moved in a reverse manner to that described in FIGS. 11 and 12, out of curved slot 128.

It will be recognized, based on the description provided so far, handling system 150 can be customized to ensure secure grasping of a large variety of different sized and/or shaped turbine shrouds 118. A non-comprehensive list of structures of handling system 150 that can be customized may include: first opening 222 position in elongated member 152; length L3 of elongated member 152 between first bend 158 and first opening 222; length L1 of lower portion 160 of elongated member 152 between first bend 158 and base retention member 170; length L2 of base retention member 170; angle α of first bend 158 in elongated member 152; angle β of base retention member 170 relative to elongated member 152; angle γ of ramp surface 206 (FIGS. 8A-B); size and/or shape of first portion 240 of body 192 of sliding retainer 190; and/or size, shape and/or location of protrusions 244 on first portion 240 of body 192 of sliding retainer 190.

Handling system 150 may include a plurality of customized versions thereof for different sized and/or shaped turbine shrouds 118. In addition to the previously described FIGS. 5 and 6 embodiments, FIGS. 13A-D, 14A-D and 15A-D show sets of handling systems 150A-C having different configurations, each customized for particular turbine shrouds 118A-C of a given set of shrouds. Each set of turbine shrouds 118A-C have at least one different dimension between the sets. In FIGS. 13A-D, 14A-D and 15A-D, drawings denoted as 'A' show a perspective view of handling systems 150A-C, respectively; drawings denoted 'B' show cross-sectional views of the handling systems 150A-C in a partially installed position, respectively; drawings denoted 'C' show cross-sectional views of handling systems 150A-C in an installed, operative state, respectively; and drawings, denoted 'D' show partially transparent perspective views of handling systems 150A-C in the installed, operative state, respectively.

Handling systems 150A-C may be configured for a first set of turbine shrouds having a first dimension and at least one second set of turbine shrouds 118A-C having a second, different dimension than the first set. (Turbine shrouds 118A-C in each set include a plurality of identical turbine shrouds 118A, 118B, or 118C.) The dimensions that are different between turbine shrouds 118A-C can be any dimension that would require a corresponding change in a respective handling system 150A-C, such as but not limited to turbine shroud length and/or curvature, and/or curved slot 128A-C curvature, size and/or shape. Regardless of the set to which a given turbine shroud 118A-C belongs, each turbine shroud 118 has a curved slot 128 therein. Handling systems 150A-C as described herein may be provided for each of the first set and the at least one second set of turbine shrouds 118A-C. Any number of sets of turbine shrouds 118 are possible.

A plurality of elongated members 152A-C may be provided. Elongated members 152A-C include respective first ends 154A-C and second ends 156A-C, and first bends 158A-C therein. Each elongated member 152A-C may have a different length (e.g., length L1A-C and/or L3A-C) and/or a different angle αA-C in a respective first bend 158A-C compared to the others of the plurality of elongated members 152A-C. The different lengths and angle accommodate a selected turbine shroud 118A-C of a plurality of different turbine shrouds. Lengths L2A-C of base retention member 170A-C may also have customized lengths, and angles βA-C may also be customized relative to elongated member 152. Elongated members 150A-C and first bends 158A-C are configured to be positioned in curved slots 128A-C of respective turbine shrouds 118A-C of a respective set of turbine shrouds. More particularly, first bend 158A-C in elongated member 152A-C is configured to engage inner surface 204A-C of curved slot 128A-C of turbine shroud 118A-C of the respective set and position base retention member 170A-C to engage and retain first end portion 172A-C of turbine shroud 118A-C of the respective set of shrouds on the elongated member. Base retention member 170A-C extends from first end 154A-C of elongated member 152A-C to engage and retain first end portion 172A-C of turbine shroud 118A-C of the respective set on the elongated member.

Referring to FIGS. 8A-B and 13A-15D, sliding retainer 190 may include a plurality of sliding retainers 190A-C, each sliding retainer 190A-C has at least one of a different shape and a different size compared to the others of the plurality of sliding retainers to accommodate curved slot 128A-C of turbine shroud 118A-C of a selected turbine shroud of the plurality of different turbine shrouds. As described relative to FIGS. 8A-B, sliding retainers 190A-C each include body 192 having opening 194 configured to slidingly receive a respective elongated member 152A-C for turbine shroud 118 of the respective set. As described herein, body 192 of sliding retainer 190A-C is configured to slidingly engage in curved slot 128A-C of turbine shroud 118A-C of the respective set and selectively retain second end portion 172A-C of turbine shroud 118A-C of the respective set in a handling position on the respective elongated member 152A-C. In one example, body 192 of sliding retainer 190A-C may have first portion 240 having a shape and size configured to slidingly engage in curved slot 128A-C of turbine shroud 118A-C of the respective set, and a second portion 242 (cross-sectionally) larger than first portion 240 and configured to abut second end portion 174A-C of turbine shroud 118A-C of the respective set to selectively retain second end portion 174A-C of turbine shroud 118A-C of the respective set in the handling position on elongated member 152A-C. Note, sliding retainer 190B is shown having a mating cross-section with curved slot 128B, but sliding retainer 190A is shown not have a cross-section that mates perfectly with curved slot 128A. Similarly, sliding retainer 190C in FIGS. 15A-D includes extension 208 (see also FIG. 8B), where the other sliding retainers 190A-B do not.

With reference to FIGS. 8A-B, 9, 10A-C, 13A-D, 14A-D and 15A-D, lock 220A-C is coupled to sliding retainer 190A-C and selectively movable between a locked position in which lock 220A-C retains sliding retainer 190A-C in the handling position and an unlocked position in which sliding retainer 190A-C slides freely on elongated member 152A-C. Sliding retainer 190A-C includes first end 196, second end 198, first side 200 and second side 202. First side 200 of sliding retainer 190A-C may extend farther from first end 196 of sliding retainer 190A-C than second side 202 of the sliding retainer. First side 200 of sliding retainer 190A-C engages a same inner surface 204A-C of curved slot 128A-C of turbine shroud 118A-C of the respective set as first bend 158A-C of elongated member 152A-C. Lock 220A-C includes pin 230, 236 selectively movable between the locked position in which pin 230, 236 extends through first opening 222A-C in elongated member 152A-C and retains sliding retainer 190A-C in the handling position, and the unlocked position in which pin 230, 236 is retracted from first opening 222A-C in elongated member 152A-C and allows the sliding retainer 190A-C to slide freely on the respective elongated member 152A-C. In certain embodiments, shown in FIGS. 10C, 13B, 14B and 15B, in the unlocked position, pin 230, 236 is positioned in second opening 246A-C in elongated member 152 spaced from first opening 222A-C. In certain embodiments, the pin may include a spring-loaded pin 236 coupled to sliding retainer 190A-C.

As described previously, handles 250A-C may also vary depending on the set of turbine shrouds 118A-C, e.g., turbine shroud 118B may be sufficiently small that a lifting element 256 (FIG. 5) is not necessary.

Handling system 150 and parts thereof, unless otherwise stated herein, may be made of any metal or metal alloy having sufficient strength for the stated purposes thereof. Handling system 150 and parts thereof may be made using any now known or later developed manufacturing techniques, e.g., machine-based manufacture such as cutting, welding, bending, etc., and/or additive manufacturing.

Embodiments of the disclosure provide various technical and commercial advantages, examples of which are discussed herein. The handling system enables safe grasping and lifting of a turbine shroud. The handling system is customizable for any variety of different sized turbine shrouds, and addresses handling requirements in both the factory and the field. The system can be attached ergonomically and safely despite limited access to the turbine shroud caused by, for example, tight-fitting transportation containers. The system also reduces cycle time in the field by allowing turbine shrouds to be installed in the factory, thus reducing field handling and potential damage to capital parts.

Approximating language, as used herein throughout the specification and claims, may be applied to modify any quantitative representation that could permissibly vary without resulting in a change in the basic function to which it is related. Accordingly, a value modified by a term or terms, such as “about,” “approximately” and “substantially,” are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise. “Approximately,” as applied to a particular value of a range, applies to both end values and, unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and their practical application and to enable others of ordinary skill in the art to understand the disclosure such that various modifications as are suited to a particular use may be further contemplated.

What is claimed is:

1. A handling system for a turbine shroud having a slot therein, the handling system comprising:

an elongated member including a first end and a second end, the elongated member including a first bend therein, the elongated member configured to be positioned in the slot of the turbine shroud;

a base retention member extending from the first end of the elongated member to engage and retain a first end portion of the turbine shroud on the elongated member;

a sliding retainer including a body having an opening configured to slidingly receive the elongated member, the body of the sliding retainer configured to slidingly engage in the slot and selectively retain a second end portion of the turbine shroud in a handling position on the elongated member; and a lock coupled to the sliding retainer and selectively movable between a locked position in which the lock retains the sliding retainer in the handling position and an unlocked position in which the sliding retainer slides freely on the elongated member.

2. The handling system of claim 1, wherein the lock includes a pin selectively movable between the locked position in which the pin extends through a first opening in the elongated member and retains the sliding retainer in the handling position, and the unlocked position in which the pin is retracted from the first opening in the elongated member and allows the sliding retainer to slide freely on the elongated member.

3. The handling system of claim 2, wherein, in the unlocked position, the pin is positioned in a second opening in the elongated member spaced from the first opening.

4. The handling system of claim 2, wherein the pin includes a spring-loaded pin coupled to the sliding retainer.

5. The handling system of claim 1, wherein the first bend in the elongated member is configured to engage an inner surface of the slot and position the base retention member to engage and retain the first end portion of the turbine shroud on the elongated member.

6. The handling system of claim 5, wherein the sliding retainer includes a first end, a second end, a first side and a second side, and wherein the first side of the sliding retainer extends farther from the first end of the sliding retainer than the second side of the sliding retainer, and wherein the first side of the sliding retainer engages a same inner surface of the slot of the turbine shroud as the first bend of the elongated member.

7. The handling system of claim 6, wherein the second side of the sliding retainer includes a ramped surface extending at less than 90° from the elongated member.

8. The handling system of claim 1, wherein the body of the sliding retainer has a first portion having a shape and size configured to slidingly engage in the slot, and a second portion larger than the first portion and configured to abut the second end portion of the turbine shroud to selectively retain the second end portion of the turbine shroud in the handling position on the elongated member.

9. The handling system of claim 1, further comprising a spacing member coupled to the elongated member adjacent the base retention member.

10. The handling system of claim 1, further comprising a handle coupled to the second end of the elongated member.

11. The handling system of claim 1, wherein the base retention member extending from the first end of the elongated member includes a second bend in the elongated member.

12. The handling system of claim 1, wherein the elongated member includes a plurality of elongated members, each elongated member having a different length and a different angle in a respective first bend compared to others of the plurality of elongated members to accommodate a selected turbine shroud of a plurality of different turbine shrouds, and wherein the sliding retainer includes a plurality of sliding retainers, each sliding retainer having at least one of a different shape and a different size compared to others of the plurality of sliding retainers to accommodate the slot of the turbine shroud of a selected turbine shroud of the plurality of different turbine shrouds.

13. The handling system of claim 1, wherein the slot is a curved slot.

14. A handling system for a first set of turbine shrouds having a first dimension and at least one second set of turbine shrouds having a second, different dimension than the first set, the turbine shrouds of both sets having a curved slot therein, the handling system comprising for each of the first set and the second set:

an elongated member including a first end and a second end, the elongated member including a first bend therein, the elongated member and the first bend configured to be positioned in the curved slot of the turbine shroud of a respective set;

a base retention member extending from the first end of the elongated member to engage and retain a first end portion of the turbine shroud of the respective set on the elongated member;

a sliding retainer including a body having an opening configured to slidingly receive the elongated member for the turbine shroud of the respective set, the body of the sliding retainer configured to slidingly engage in the curved slot of the turbine shroud of the respective set and selectively retain a second end portion of the turbine shroud of the respective set in a handling position on the elongated member; and a lock coupled to the sliding retainer and selectively movable between a locked position in which the lock retains the sliding retainer in the handling position and an unlocked position in which the sliding retainer slides freely on the elongated member.

15. The handling system of claim 14, wherein the lock includes a pin selectively movable between the locked position in which the pin extends through a first opening in the elongated member and retains the sliding retainer in the handling position, and the unlocked position in which the pin is retracted from the first opening in the elongated member and allows the sliding retainer to slide freely on the elongated member.

16. The handling system of claim 15, wherein, in the unlocked position, the pin is positioned in a second opening in the elongated member spaced from the first opening.

17. The handling system of claim 15, wherein the pin includes a spring-loaded pin coupled to the sliding retainer.

18. The handling system of claim 14, wherein the first bend in the elongated member is configured to engage an inner surface of the curved slot of the turbine shroud of the respective set and position the base retention member to engage and retain the first end portion of the turbine shroud of the respective set on the elongated member.

19. The handling system of claim 18, wherein the sliding retainer includes a first end, a second end, a first side and a second side, and wherein the first side of the sliding retainer extends farther from the first end of the sliding retainer than the second side of the sliding retainer, and wherein the first side of the sliding retainer engages a same inner surface of the curved slot of the turbine shroud as the first bend of the elongated member.

20. The handling system of claim 14, wherein the body of the sliding retainer has a first portion having a shape and size configured to slidingly engage in the curved slot of the turbine shroud of the turbine shroud of the respective set, and a second portion larger than the first portion and configured to abut the second end portion of the turbine shroud of the respective set to selectively retain the second end portion of the turbine shroud of the turbine shroud of the respective set in the handling position on the elongated member.

21. A method of grasping a turbine shroud having a curved slot therein, the method comprising:

positioning an elongated member in the curved slot of the turbine shroud, the elongated member including a first end, a second end, a first bend between the first end and the second end and a base retention member extending from the first end and engaging and retaining a first end portion of the turbine shroud on the elongated member;

sliding a sliding retainer along the elongated member and into the curved slot at a second end portion of the turbine shroud to a handling position on the elongated member, the sliding retainer configured to abut the second end portion of the turbine shroud in the handling position; and locking the sliding retainer in a locked position in which the sliding retainer is fixed relative to the elongated member in the handling position and the sliding retainer grasps and retains the turbine shroud on the elongated member.

* * * * *